(12) United States Patent
Yamazaki et al.

(10) Patent No.: US 6,850,470 B2
(45) Date of Patent: Feb. 1, 2005

(54) OPTICAL DISC APPARATUS AND METHOD THEREOF

(75) Inventors: Shigeki Yamazaki, Hitachinaka (JP); Hiroyuki Minamura, Kokubunji (JP); Hisataka Sugiyama, Kodaira (JP); Tetsuya Fushimi, Hitachinaka (JP); Makoto Itagaki, Yokohama (JP)

(73) Assignees: Hitachi, Ltd., Tokyo (JP); Hitachi Softwear Engineering Co., Ltd., Yokohama (JP)

( * ) Notice: Subject to any disclaimer, the term of this patent is extended or adjusted under 35 U.S.C. 154(b) by 355 days.

(21) Appl. No.: 10/214,367

(22) Filed: Aug. 8, 2002

(65) Prior Publication Data

US 2002/0191513 A1 Dec. 19, 2002

Related U.S. Application Data

(63) Continuation of application No. 09/968,968, filed on Oct. 3, 2001, now Pat. No. 6,438,078, which is a continuation of application No. 09/291,216, filed on Apr. 14, 1999, now Pat. No. 6,301,210.

(30) Foreign Application Priority Data

Apr. 14, 1998 (JP) .......................................... 10-102388

(51) Int. Cl.$^7$ ............................................... G11B 7/00
(52) U.S. Cl. ............................... 369/47.53; 369/47.55; 369/44.35
(58) Field of Search ........................... 369/44.35, 44.36, 369/47.51, 47.53, 47.55, 53.28

(56) References Cited

U.S. PATENT DOCUMENTS 6,067,284 A 5/2000 Ikeda et al.

*Primary Examiner*—Nabil Hindi
(74) *Attorney, Agent, or Firm*—Antonelli, Terry, Stout & Kraus, LLP

(57) ABSTRACT

An optical disc apparatus and method for recording and reproducing information to/from an optical disc, including discrimination of the optical disc, reading control information in an un-recordable area formed in an inner periphery of the optical disc, conducting focus control based on a focus error signal in a recordable area formed outside of the un-recordable area, and determining an optimum offset value of the focus error signal in the recordable area. Further, adjustment in amplitude of a reproduced signal from an inner periphery of the recordable area is conducted, test-writing in the inner periphery of the recordable area is conducted, test-writing in an outer periphery of the recordable area is conducted, and adjustment in amplitude of a reproduced signal from the outer periphery of the recordable area is conducted. The respective operations are conducted sequentially so as to make the optical disc in a reproducible and recordable condition.

10 Claims, 16 Drawing Sheets

OPTICAL DISC APPARATUS AND METHOD THEREOF

CROSS REFERENCE TO RELATED APPLICATION

This is a continuation of U.S. application Ser. No. 09/968,968, filed Oct. 3, 2001, now U.S. Pat. No. 6,438,078, which is a continuation of U.S. application Ser. No. 09/291,216, filed Apr. 14, 1999, now U.S. Pat. No. 6,301,210 the subject matter of which is incorporated by reference herein.

BACKGROUND OF THE INVENTION

1. Field of the Invention

The present invention relates to a reproducing apparatus and a method of an optical information recording medium for reproducing recorded information from the optical information recording medium in which the information is recorded on a disc-like medium with pits or the like, or a recording/reproducing apparatus being further possible to record information (hereinafter, it is called only by a recording/reproducing apparatus of an optical information medium), and in particular to an optical disc apparatus for performing the recording/reproducing of information on a medium of so-called a land-groove method.

2. Description of Related Art

Conventionally, various kinds or types of recording/reproducing apparatuses for optical information recording medium are already known and are in practical use, which read out the recorded information optically for reproduction thereof, from an optical information recording medium on which the information is recorded by forming pits with use of so-called a phase-change or the like on a disc-like optical recording medium. In particular, recent years, an optical recording medium, being able to record a large amount of information with high density in the recorded information, was proposed and attracting attentions, for example that called by a VD (digital video disc), and also a reproducing apparatus for reading out the information thereof, a part thereof, is already available on a market.

However, with such the high density recording medium including such as the DVD, etc., for the purpose of increasing the density in information recorded on the disc-like medium, a laser beam is applied to, being shorter in the wavelength than that used in previous, and further for the purpose of increasing the density in track pitch, a concave portion and a convex portion, being called groove area and land area respectively, are formed on the recording surface of the medium, so as to record the information in those areas. More, the land area or the groove area appears alternatively for each round, following a tacking operation by an optical pickup as an optically reproducing means. Also, as such the high density recording mediums, there are proposed various kinds of recording mediums, such as a recording medium which enables only reproduction of the information recorded, a recording medium which enables recording of only one-time, and further a recording medium which enables a plurality of times of recordings, etc. However, among those kinds of the recording mediums, characteristics or properties are different to one another, in particular in reflectivity or reflection factor thereof.

On a while, in a recording/reproducing apparatus of optical recording medium for reproducing the recorded information from such the high density recording medium, in which such the concave and the convex portions called as the land area and the groove area are formed, conventionally, a control is applied for controlling a focus position of the optical reproducing means thereof, in which the focus position for the land area and the focus position for the groove area are exchanged alternatively, for each round, in synchronism with an address signal recorded in an area defined between the land area and the groove area, namely called by a pit address, in advance.

Also, from conventionally, a high reliability of the information is achieved by conducting a so-called verify control, i.e., it is confirmed whether the recorded data can be reproduced correctly or not when recording information onto the optical recording medium.

However, with such the high density recording medium, for correctly reproducing the information recorded with high density or for recording it, there are necessitated initialization of various devices constructing the optical disc apparatus and control of operations for performing the recording/reproducing smoothly. In particular, with such the apparatus necessitating such the accurate control, many confirmations must be performed from a turning ON of a power supply up to a ready condition, i.e., the information can be read out from the optical disc correctly.

For example, in the optical disc apparatus, it must be decided whether the optical disc is inserted or not, first, under the condition where the power supply is turned ON, and further, whether the optical disc is a CD-ROM, a DVD-ROM or a DVD-RAM. Setting condition varies for those different optical discs, therefore it is very important.

Also for the high density recording medium mentioned above, for the purpose of reproducing the information recorded with high density, it is necessary to control an optical pickup as the optical reproducing means, in particular the focus position of the focus lens, with higher accuracy. Ordinarily, with the recording/reproducing apparatus for optical information medium, the focus position is adjusted so as to be controlled at an appropriate position obtained in advance when being shipped, however, it is important to control the focus position at an appropriate position in conformity with, for example, the kind and/or condition of the recording medium, and further an environment of use of the apparatus, including the temperature and so on. For that purpose, modifying the focus position to an ideal position is conducted on a basis of the recorded data which is reproduced actually with the apparatus by applying a control, such as a learning control, etc.

Further than the above, the confirmation must be made on many operations, including such as presence of a cassette, selection of the optical pickup, adjustment of tracking, adjustment of writing in, etc.

SUMMARY OF THE INVENTION

An object, according to the present invention, for dissolving such problems as mentioned, is to provide an optical disc apparatus being able to be in a condition where the reading and writing can be performed, with smoothly confirming the operations in a short time period.

According to the present invention, for accomplishing the object mentioned above, there is provided an optical disc apparatus for recording and reproducing information of an optical disc, comprising:

means for discriminating the optical disc;

means for reading control information in an un-recordable area which is formed in an inner periphery of said optical disc;

means for conducting focus control in a recordable area which is formed outside of said un-recordable area;

means for conducting adjustment in amplitude of a reproduced signal from an inner periphery of said recordable area;

means for conducting test-writing in the inner periphery of said recordable area;

means for conducting test-writing in an outer periphery of said recordable area; and means for conducting adjustment in amplitude of a reproduced signal from the outer periphery of said recordable area, wherein said means conducts the respective operations sequentially, so as to make said optical disc in reproducible and recordable condition. And, more preferably, according to the present invention, there is provided the optical disc apparatus as mentioned above, further comprising means for conducting a pre-writing (a sample-writing), wherein said means conducts the pre-writing between the operation of discriminating of said optical disc and the operation of test-writing in the outer periphery of said recordable area.

According to the present invention, for accomplishing the object mentioned above, there is also provided a method for making an optical disc in reproducible and recordable condition with use of an optical disc apparatus for recording and reproducing information of the optical disc, comprising following steps:

discriminating the optical disc;

reading control information in an un-recordable area which is formed in an inner periphery of said optical disc;

conducting focus control in a recordable area which is formed outside of said un-recordable area;

conducting adjustment in amplitude of a reproduced signal from an inner periphery of said recordable area;

conducting test-writing in the inner periphery of said recordable area;

conducting test-writing in an outer periphery of said recordable area; and conducting adjustment in amplitude of a reproduced signal from the outer periphery of said recordable area, wherein said means conducts the respective operations sequentially, so as to make said optical disc in reproducible and recordable condition. And, more preferably, according to the present invention, there is provided the method as defined in the above, further comprising a step for conducting a pre-writing (a sample-writing), wherein said means conducts the pre-writing between the operation of discriminating of said optical disc and the operation of test-writing in the outer periphery of said recordable area.

DESCRIPTION OF THE PREFERRED EMBODIMENTS

Hereinafter, detailed explanation of the embodiments according to the present invention will be given by referring to attached drawings.

First, the construction of an outline of an optical disc apparatus according to the present invention will be explained by referring to FIG. 1. This FIG. 1 shows a block diagram of the optical disc apparatus being able to read and write an optical information recording medium of an embodiment.

Figure 1:
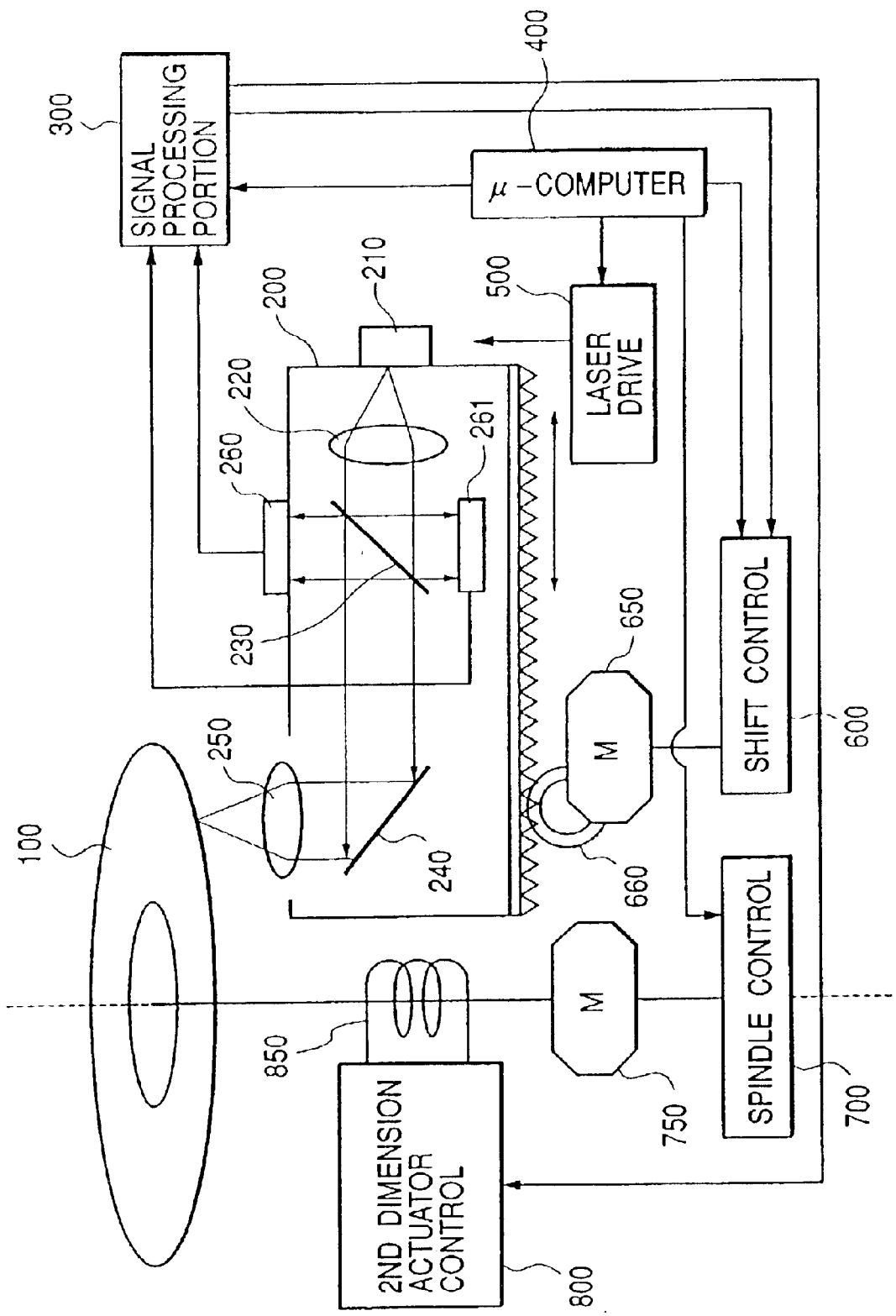
FIG. 1 is a block diagram of an optical disc apparatus being able to read and write therewith, according to the present invention.

First, in FIG. 1, a reference numeral 100 indicates an optical disc of the high density recording medium, a reference numeral 2 indicates an optical pickup, inside which are provided a semiconductor laser 210 as a light emitting element for emitting a laser light beam of a desired wavelength, a condenser optical lens 220 for turning the laser light emitted into a parallel light, a half-mirror 230 for penetrating a portion of an incident light as well as for reflection the other portion, a mirror 240 for changing a direction of the light, a focus lens 250 for irradiating the laser beam focused to a predetermined beam diameter onto a recording surface of the above optical disc 100, and an light receiving element 260 for receiving and detecting a refection light from the above half mirror 230, etc. Here, a reference numeral 261 indicates an another front light receiving element for receiving and detecting the reflection light from the above half mirror 230, wherein the signal obtained through the said front light receiving element 261 is compared with a target voltage for reproduction by means of a comparator not shown in the figure but provided in a signal processing portion 300, and a predetermined signal is feedback to a laser driver circuit 500 so as to make them equal. By means of this feedback loop, the intensity or strength in emitting light of the laser is controlled when reproducing the information.

Here, in this embodiment, in order to change the focus distance of the condenser lens 220 in conformity with the thickness of the optical lens 100, it is constructed with two objective lens for use in the DVD and the CD. This pair of the two condenser lenses 220 can be exchanged by a mechanism of moving quickly in horizontal direction. Ordinarily, in a case where a tracking servo is in operation, since a stabilizing point lies in or at an optimal position, it is possible to move the lens momentarily in horizontal by giving a kick-pass signal to a tracking control system when shifting the lens, so as to fall in the stabilizing point of tracking of the other lens.

Further, in FIG. 1, a reference numeral 300 indicates the signal processing portion for conducting a predetermined process by converting the reflection light into electrical signal, being detected with the light receiving element 260 of the optical reproducing means mentioned above. This signal processing portion 300 is connected to a micro-computer 400 provided for controlling the optical disc apparatus, the reproducing apparatus of optical information recording medium, totally, thereby performing various controls including a focus control which will be mentioned in details below. Namely, this micro-computer 400 is connected further to a laser driver circuit 500, a shift controller circuit 600, a spindle controller circuit 700, and a two-dimension actuator control circuit 800.

Namely, with such the construction mentioned above, the micro-computer 400 control the intensity of the emission light by controlling current supplied to the semiconductor laser 210, i.e., the light emitting element of the optical pickup of the optical reproducing means mentioned above, and also control the position of the above optical pickup 200 in the radial direction of the optical disc 100 by controlling the rotation of a motor 650 for shift control. In this embodiment, as a mechanism shifting in the radial direction of the optical disc 100, there is indicated a gear 660 for moving the optical pickup 200 into the radial direction by rotation of the above motor 650 for shift control. However, this should not be restricted to it.

Also, the micro-computer 400 realizes a control of a linear velocity constant which is widely adopted in such the high density information recording medium, such as a LVC (constant linear velocity) or a ZCLVC (zoned constant linear velocity), etc., by controlling the rotation of a motor 750 which rotationally drives the spindle. In particular, in the ZCLVC of the latter, a revolution number (or angular velocity) is controlled to be constant in each zone, and the revolution number is changed for every zone. Further, this micro-computer 400 realizes the focus position control of the focus lens 250 in the above optical pickup 200, with electromagnetic function by use of an electromagnetic coil 850 or the like, as an actuating means for example, through the two-dimension actuator control circuit 800. However, the two-dimension position control of the focus realized with this two-dimension actuator control circuit 800 includes, in addition to the position control of the focus lens 250 in a direction perpendicular to the recording surface of the above optical disc 100, further the tracking position control for tracing the track with minute position adjustment in the radial direction perpendicular thereto, and the exchange between the above-mentioned two optical lenses for condensing light.

Figure 2:
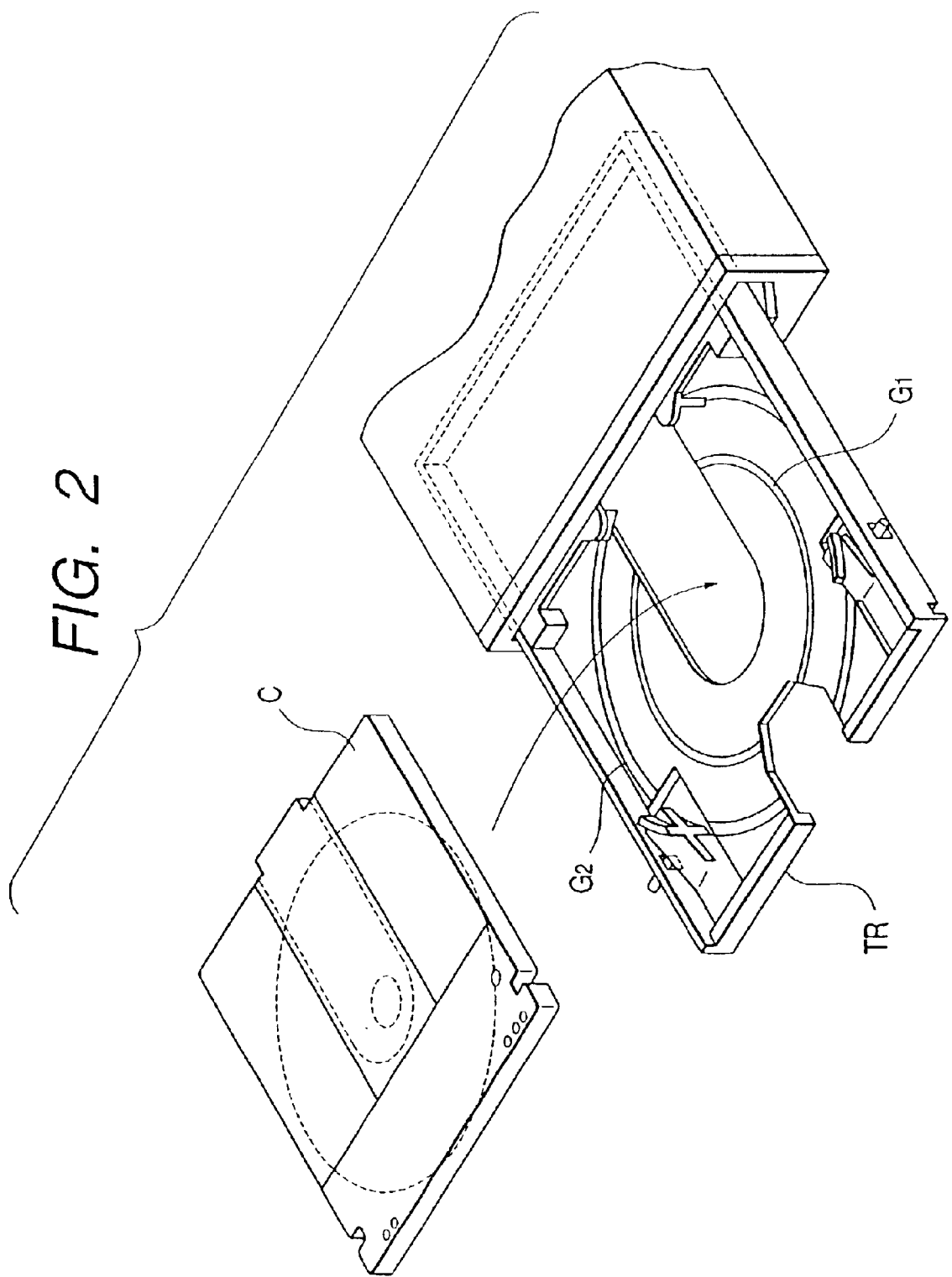
FIG. 2 is an outlook view of the optical disc apparatus according to the present invention.

The block of the apparatus shown in FIG. 1 is, ordinarily, received in a housing or case shown in FIG. 2 for example, so as to constitutes a optical disc apparatus. In this optical disc apparatus is provided a tray being provided with an insertion mechanism, not shown in the figure, but being attached within the housing in able to project and setting the optical disc onto the above motor 750 to be ratable thereon. The CD or the DVD-RAM, etc., ordinarily, only the disc itself is mounted on the tray TR to be inserted into the apparatus, however, in particular for the DVD-RAM, as shown in FIG. 2 for example, sometimes it is received within a case called as a cartridge C to be used, therefore the tray TR is so constructed that also the cartridge C can be mounted thereon. For coping with both modes in use of the disc (i.e., the disc is used as itself, or is used being received within the cartridge), the tray TR are provided with guiding groove G1 and G2 in use for a disc itself, being coincide with disc diameters 8 cm and 12 cm respectively, and is provided with claws or nails for fixing the cartridge thereon. Further, in this embodiment, a detection means (a switch or a sensor) is provided for detecting the presence of the above cartridge C. This is because, the optical disc using the cartridge C is the DVD-RAM only at the present time, therefore the optical disc can be easily identified to be the DVD-RAM by confirming the presence of the cartridge C.

Then, according to this embodiment, an command or an information data from a host, of such as a personal computer, not shown in the figure, is interpreted with an interface controller circuit, while the recording/reproducing and seek operations of the information being executed through a microcomputer 400, and it is recorded on the optical disc 100 through the optical head after being converted by a signal modulator processing portion 300. Also, various kinds of signals being read through the light receiving element 260 are de-modulated back to original date through the signal processing portion 300, and the de-modulated data can be transferred from the interface controller circuit to the host responding to a reproduction command.

Also, during the recording/reproducing, the various kinds of control information being recorded in the optical disc 100 are reproduced by the signal processing portion 300, so as to be used for controls of the various kinds of devices and/or apparatuses mentioned above.

Figure 3A:
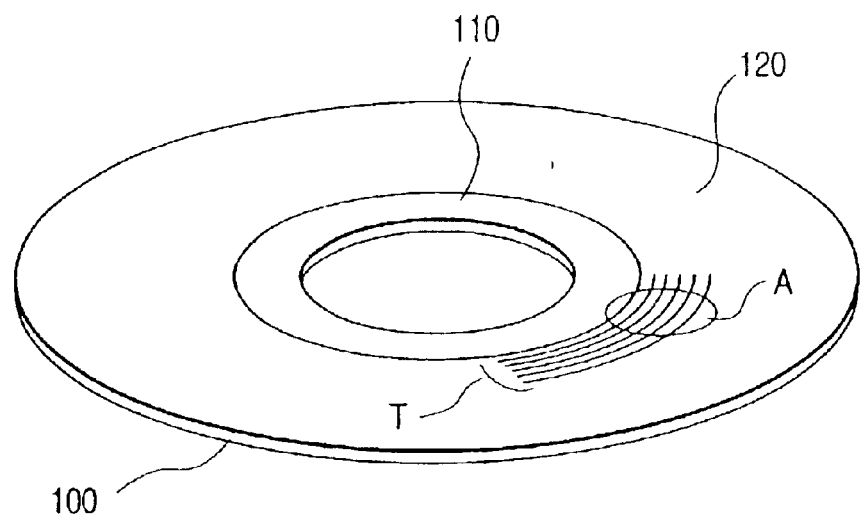
FIG. 3 is an outlook view of an optical disc, such as DVD, which can be reproduced or recorded by the optical disc apparatus according to the present invention.
Figure 3B:
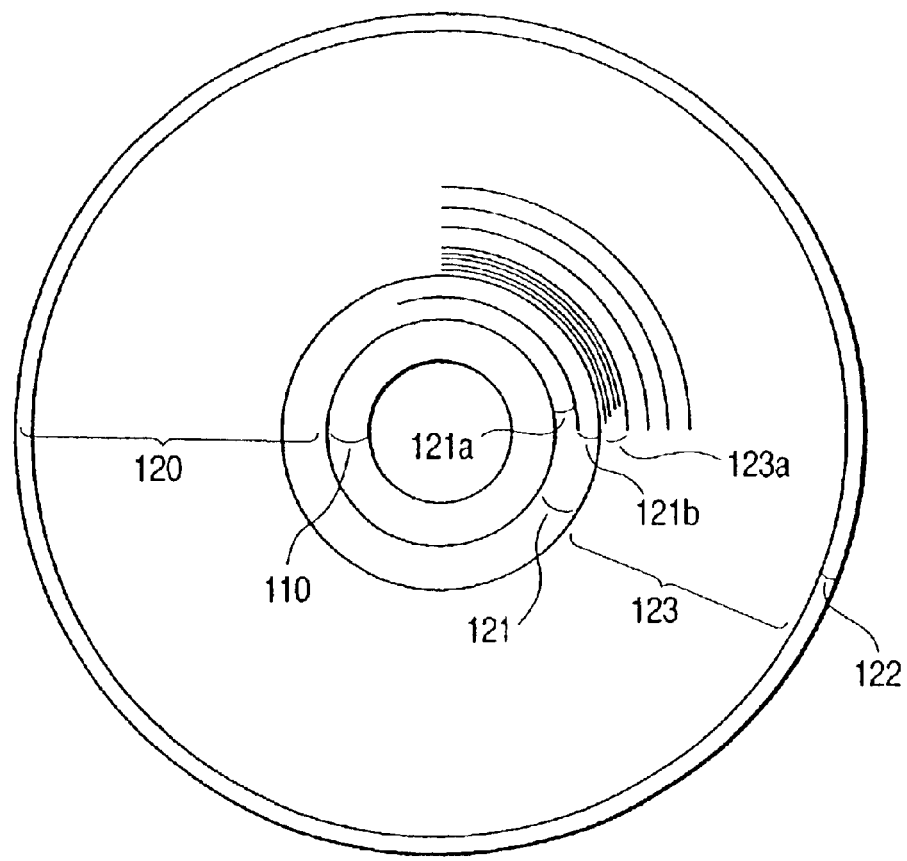
Figure 4:
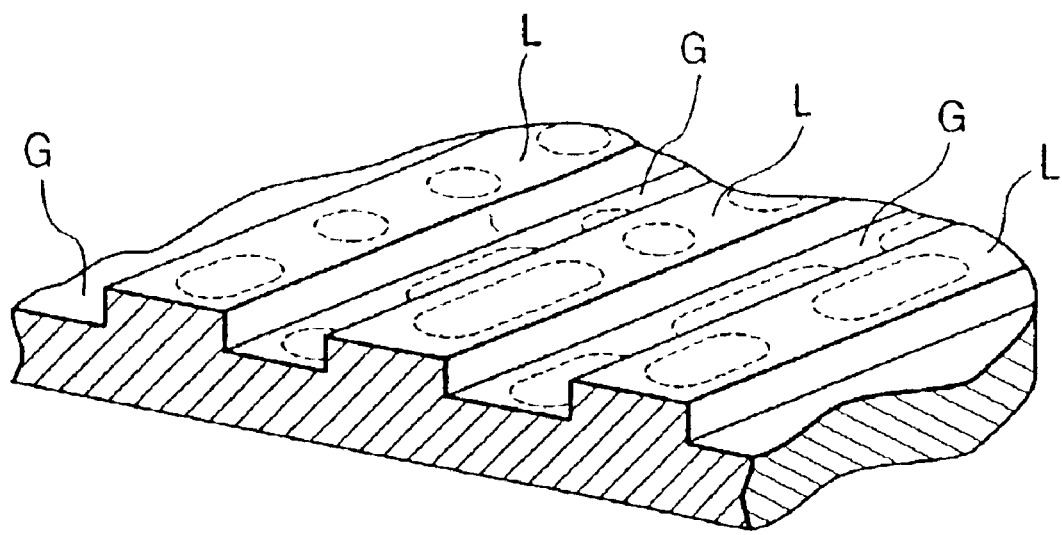
FIG. 4 is a cross-section view of the DVD shown in FIG. 3, in particular in a land area and a groove area of an information recording portion thereof.
Figure 5A:
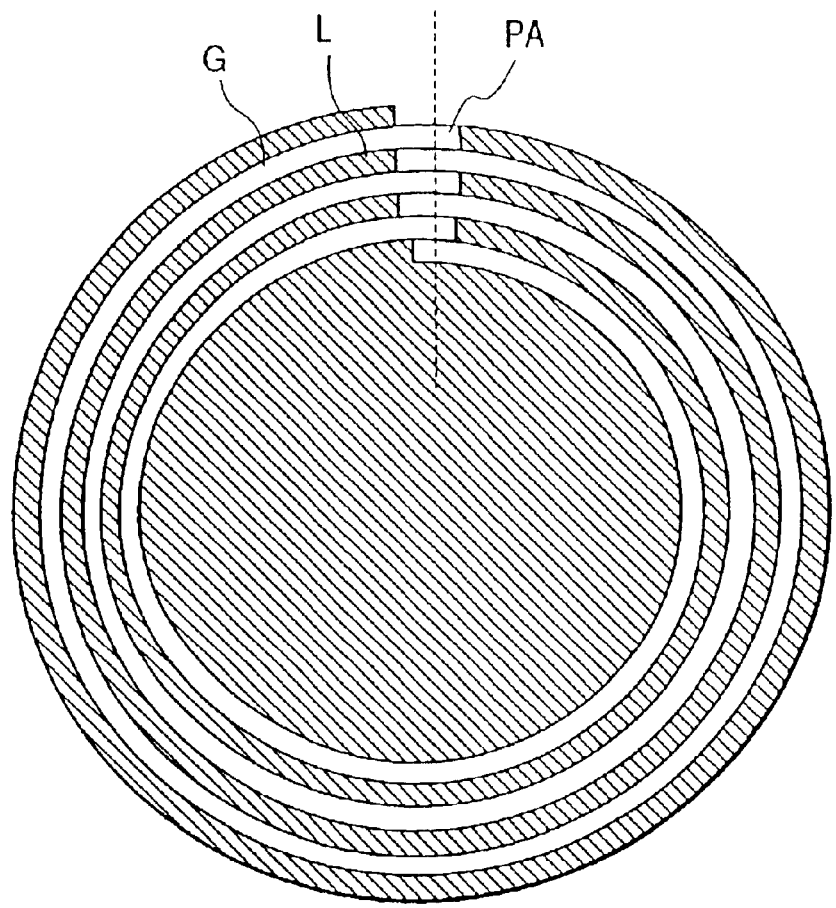
FIG. 5 is an explanatory view of explaining a forming format of the land area and the groove area in the DVD shown in FIG. 3.
Figure 5B:
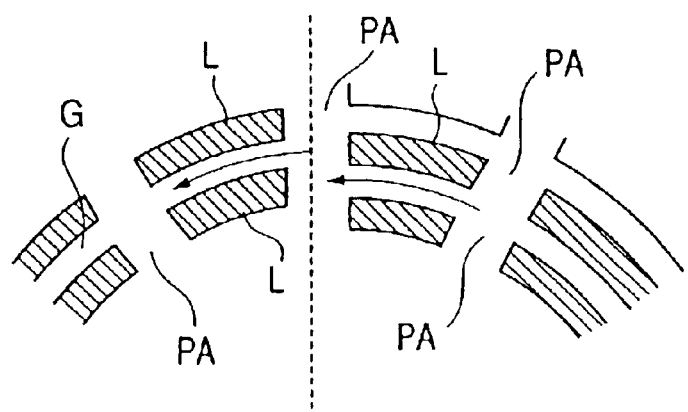

Next, by referring to FIGS. 3 through 5, the optical disc 100 as the high density recording medium being called VD-RAM will be explained in details. FIG. 3 shows an outlook of the DVD as the high density recording medium, from and into which information will be reproduced and recorded by means of the recording/reproducing apparatus for optical information recording media, and in particular, FIG. 3(a) shows a perspective view, and Fig. (b) a plane view thereof. FIG. 4 shows a cross-section view of the land area and the groove area of the information recording portion in the DVD shown in FIG. 3. FIG. 5 is for explanation view of a forming format of the land area and the groove area in the DVD as one of the high density information recording media, in particular, FIG. 5(a) shows the construction of the land area and the groove area, and FIG. 5(b) explains the format of each area of them. FIG. 6 is an enlarged view of a portion for showing a pit address area defined between the land area and the groove area in the DVD.

First, an explanation will be given on the optical disc 100, i.e., the DVD-RAM shown in FIG. 3. Among such the optical discs, in particular, with the recordable medium being called by VD-RAM it is possible to write information by forming pits in the recording layer within the substrate, with use of phase change due to irradiation of such as the laser light. And, thereafter, the information is reproduced with the pits which are written in it. Or, with the read-only medium being called by VD-ROM the laser light is irradiated upon the recording surface on which information is written previously, and the recorded information is reproduced by the reflection light thereof.

However, the optical disc 100 shown in FIG. 3 is only one example of the optical information recording media, such as the recordable medium called by VD-RAM and can be divided into a ROM portion at a center thereof, into which predetermined control information is recorded, and a RAM portion 120 facing around thereof. With such the high density receding medium as mentioned in the above, on the RAM portion 120 as the information recording area is formed a spiral track T thereof for the purpose of recording the information on the disc continuously, and at the same time, for the purpose of increasing the recording density thereof, it is formed divided into concave and convex area, which are called as the land area and the groove area, respectively, so as to enable the recording/reproducing of the information.

Further, the RAM portion 120 mentioned above is divided into several areas. Namely, at an inner side and an outer side of the RAM portion are provide areas 121 and 122, into which the information relating to the control of the apparatus is recorded, and further between them is provided a user area 123 into which the information of the user can be written.

Moreover, the above-mentioned writing area 121 is divided into an area 121a for the disc information and an area 121b for the apparatus information. The area 121b for the apparatus information is used upon operation of test writing which will be explained in details later. Also, the user are 123 is constructed with a plurality of areas 123a which are further divided in plurality in the radial direction thereof. Further, at the each most-outer periphery of the above areas 123a are prepared is prepared an alternative block, which can be the recording area in place of the area 123a in inner side thereof when the writing is in failure in it. Each of the alternative blocks will be used, principally, as the alternative block for the corresponding block 123a, however, it can be used as the alternative block for the other block 123a when it is full. In this instance, the writing is so controlled that it is conducted into the alternative block being nearest to it.

Next, FIG. 4 shows the cross-section of the land area and the groove area of such the information recording area. In this figure, the land are is indicated with a mark while the groove area with wherein those land area L and groove area G are formed one by one in the radial direction of the disc-like recording medium 100 and in those land area L and groove area G are formed the so-called pits, as indicated with broken lines in the figure, so as to record the information therewith.

Further, in FIG. 5 are indicated the forming format of the above-mentioned land L and groove area G in such the high density recording medium, wherein the land area L is indicated by a hatched area, while the groove area G is defined therebetween. Those land L and groove G areas are formed with exchanging between the land area L and the groove area G alternatively by an unit of one round of the disc-like optical disc 100. In this figure, the land area L and the groove area G are exchanged on the boarder of the portion indicated by a one-dotted chain line. Further, those land L and groove G areas are formed with units being called as sectors of from 17 to 34 in the number thereof, per a unit of one round of the track on the disc, respectively, and those sectors are divided by the area which is called as the pit address area PA therebetween. Furthermore, the RAM area 120 in the disc is divided into the areas 123a in the direction from inner periphery to outer one. Each of the above areas 123a is constructed with the same number of sectors therein.

Figure 6A:
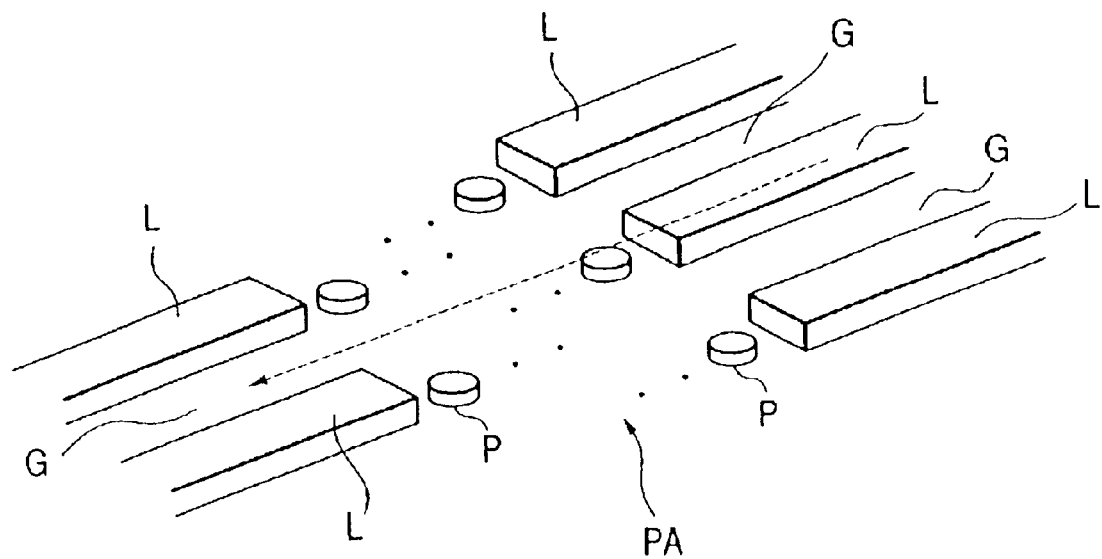
FIG. 6 is an enlarged perspective view of a pit address area defined between the land area and the groove area in the DVD shown in FIG. 3.

In FIG. 6 is shown the pit address are which is formed between the land area L and the groove area G. First, in FIG. 6(a) is shown a portion where it transit from the land area L to the groove area G (i.e., the pit address area of the portion of the one-dotted chain line in the above FIG. 5), and then, the laser light for detecting the recorded signal is shifted from the land area L through this pit address area PA to the groove area G, as is indicated by an arrow of the one dotted chain line in the figure.

Figure 6B:
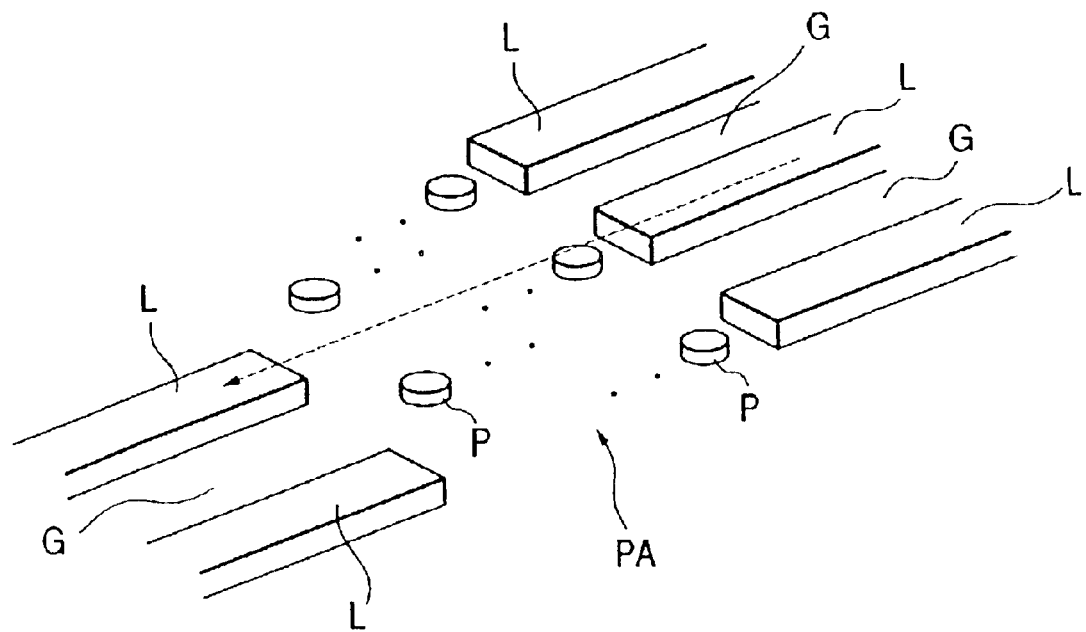

On a while, in FIG. 6(b) showing the portion shifting from the land L area to the land area L, the laser light for detecting the recorded signal also, as is shown by the one-dotted chain line in the figure, is shifted for example from the land area L through this pit address area PA to the next land area L. However, when it is shifted from the groove area G to the next groove area G, it is needless to say but, it also passes through the pit address area PA.

In this manner, in the recording medium 100 recording the information with high density, the information is recorded in the land area L and the groove area G alternatively, which are different from each other in the height thereof, therefore, for reproducing the recorded information from such the recording medium with certainty, it is necessary to control the optical pickup optimally, i.e., the optical reproducing means for reproducing the recorded information by use of the reflection light of the laser beam, in particular the focus position of the optical lens (i.e., the focus lens) for irradiating the laser beam for reproduction focused on the recording medium surface, with respect to the respective land area L and groove area G being different in the height.

Also, at the same time, in the pit address area PA mentioned above, as is apparent from the figure, address numbers on the above recording medium 100 are recorded on both sides thereof, by a plurality of pit train P, P . . . Therefore, for reproducing the information recorded from such the recording medium 100, it is necessary to detect those plurality of pits, P, P . . . in the pit address area PA, correctly or accurately.

Then, according to the present invention, in order to control the focus position of the optical lens in the above optical reproducing means optimally, in the reproduction of the recorded information from such the high density recording medium 100, there is provided the recording/reproducing apparatus of an optical information recording medium, with which the control of the optimal position by applying the learning control is performed, as well as the pits P, P . . . for recording the address number in the above pit address area PA can be detected with certainty.

Though not shown in FIGS. 3 through 6, a wobble groove (wobbling minutely in the radial direction) in radial direction is formed on the border between the land area L and the groove area G with modulating the address information around a predetermined frequency. The number of the wobbling per one round is detected through a wobble detection circuit not shown in the figure, so as to achieve the rotation control of the motor 750 through the above-mentioned spindle motor 700 with high efficiency and stability.

The pit address area PA mentioned above can be divided into two sections in the circumference direction, wherein pits P are formed in each of them. And, by comparing ID signals obtained from those two pits P, it is possible to identify the data in the sectors neighboring to each other.

Figure 7:
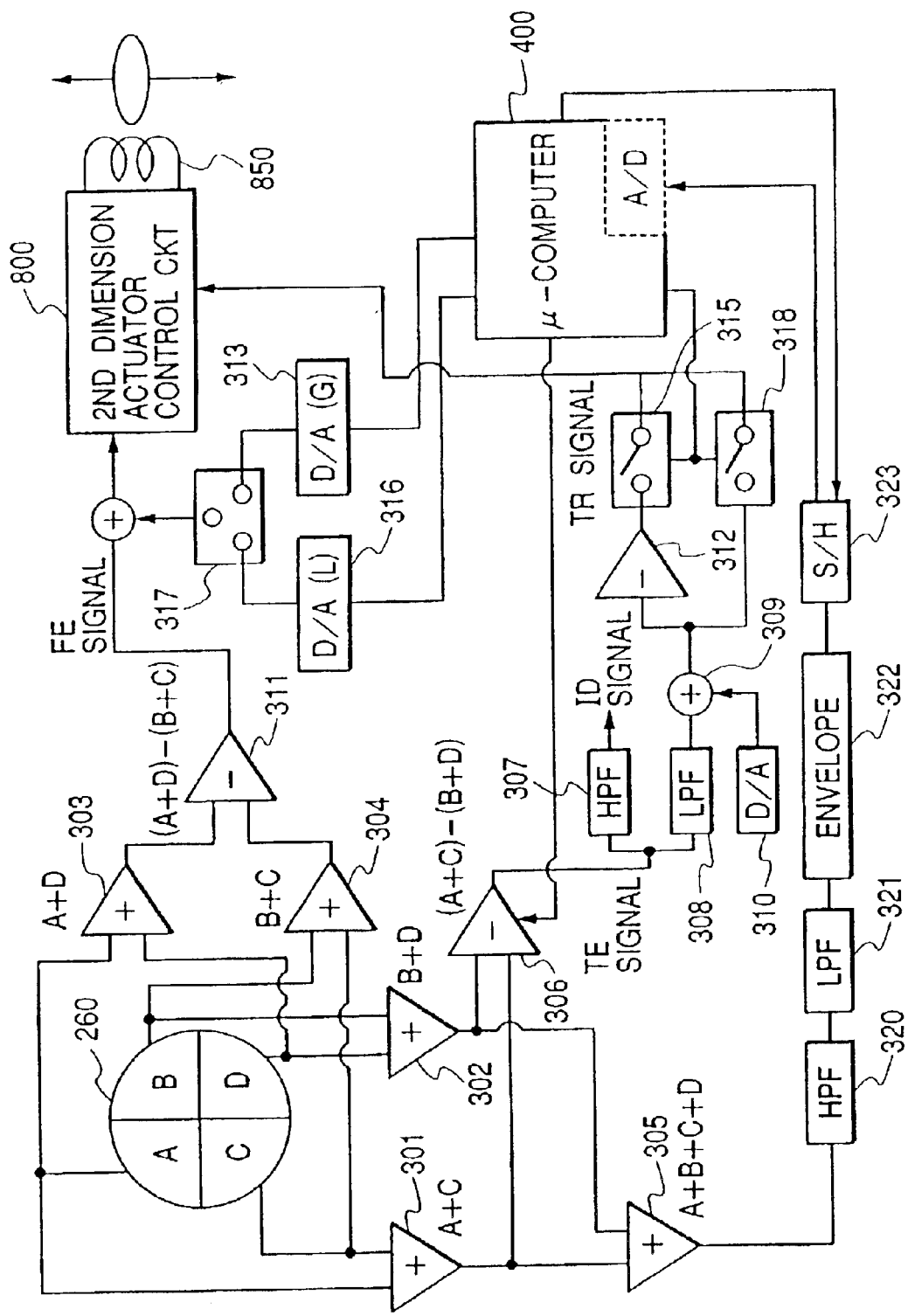
FIG. 7 is a circuit diagram of showing the circuit construction of the optical disc apparatus according to the present invention.

Next, in the attached FIG. 7, there are shown the detailed construction of those, including the light receiving element 260, the signal processing portion 300 for processing the detected signal as well as the periphery portions thereof, in particular in the optical pickup 200 as of the optical reproducing means in the optical disc apparatus for recording/reproducing of the optical information recording medium, according to the one embodiment of the present invention.

As is apparent from the figure, the light receiving element is divided into four detector portions A, B, C and D, and the reflection light incident upon this light receiving element 260 reflected upon the recording surface of the above high density recording medium 100 are converted into electric signals to be outputted through the detector portions divided, respectively. Here, the outputs from the respective detector portions A, B, C and D divided are inputted into adder circuits 301 through 304, thereby being added by (A+C), (B+D), (A+D) and (B+C), respectively. Further, the outputs from the above adder circuits 301 and 302 are inputted to an adder circuit 305, thereby being outputted a sum signal (A+B+C+D) by adding all of the outputs from the above detector portions A, B, C and D.

Figure 8:
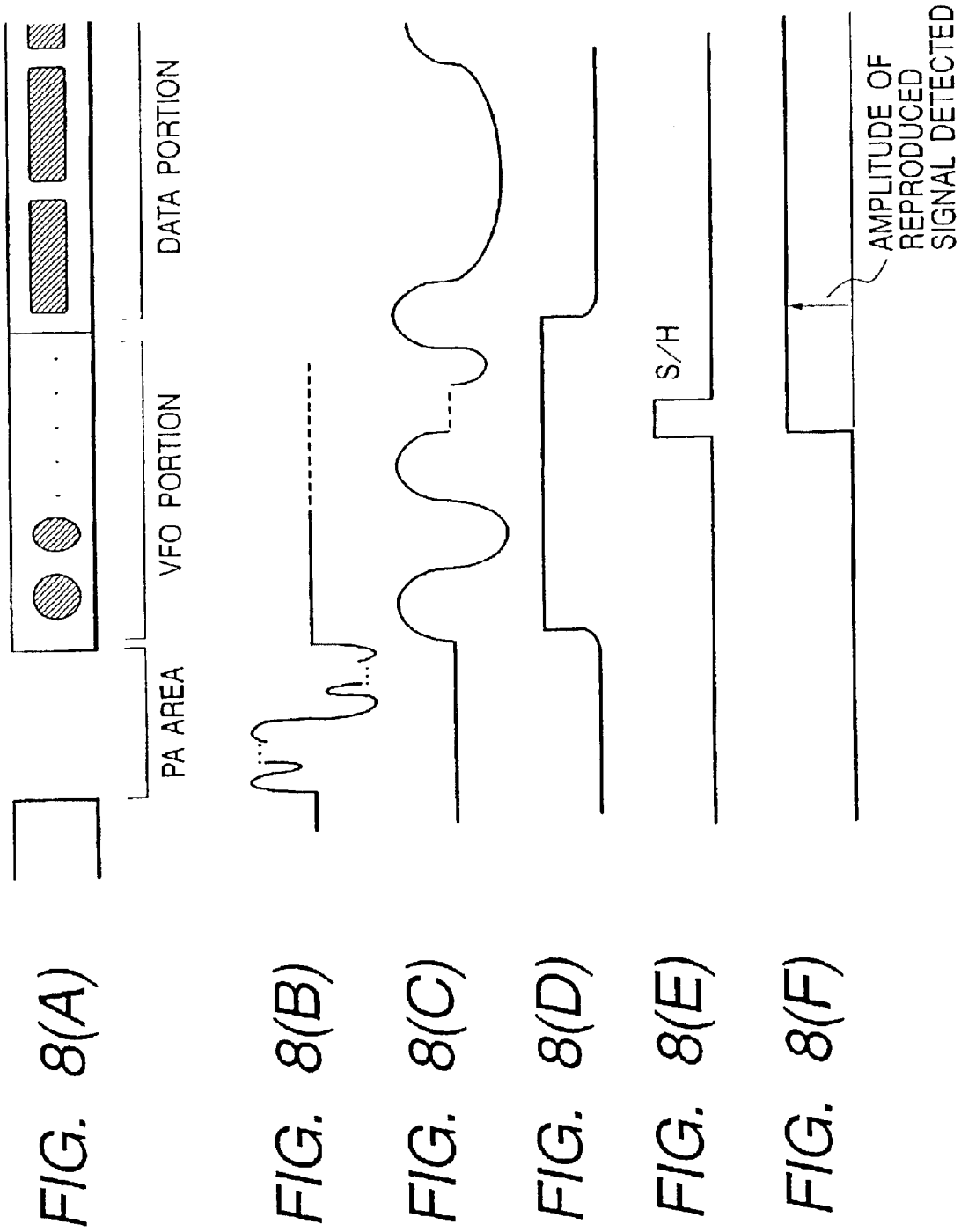
FIG. 8 shows wave-forms at various portions in the optical disc apparatus according to the present invention.

Further, at the same time, the outputs from the above adder circuits 301 and 302 are inputted into a subtraction circuit 306, thereby being outputted a tracking error signal TE at the output thereof, i.e., the signal for the tracking as is expressed by ((A+C)−(B+D)). From this tracking error signal TE is obtained an ID signal by passing it through a high pass filter (HPF) for high frequency, thereafter. Namely, this ID signal can be obtained by reading the address number pits P, P . . . shown in the above FIG. 6, as the signal wave-form as shown in FIG. 8(A), for example. Further, this ID signal read out is inputted into the above micro-computer 400, and is acknowledged as the address number for each of the sectors on the track of the recording surface of the above high density recording medium 100.

On a while, at the same time, after passing through a low pass filter (LPF) 308 for low frequency, this tracking error signal TE is added with an off-set value from a D/A converter 310 by an adder circuit 309. For tracking control in the groove area, first, the tracking error signal TE is reversed in the polarity thereof through a reverse circuit 312, and further is outputted to the above two-dimension actuator control circuit 800 through a switch element 315. On the other hand, for the tracking control in the land area, it is outputted to the above two-dimension actuator control circuit 800 through a switching element 318 thereafter. However, to one of the switching elements, i.e., the switching element 318 for passing the tracking control signal for the land (L) area, the above L/G exchange signal is inputted though a reverse circuit 319. Namely, on the basis of the tracking error signal TE, the tracking control signal for the land (L) area and the tracking control signal for the groove (G) area are alternatively outputted to the above two-dimension actuator control circuit 800. This output comes to be a TR signal for controlling the tracking, thereby controlling the position of the optical reproducing means 200 in the radial direction through the shift controller circuit 600 in the above FIG. 1. Further, to the D/A converter 310 is given the off-set value from the above micro-computer through the A/D converter portion thereof. However, an explanation of this will be omitted, since it has a little relationship with the present invention.

On a while, the signals (A+D) and (B+C) outputted from the above adder circuits 303 and 304 are inputted to the subtraction circuit 311, thereby being obtained the focus error signal FE which can be expressed by ((A+D)−(B+C)). This focus error signal FE is divided into a focus control signal FE for the above land area and a focus control signal FE for the groove area to be processed, and thereafter controls the focus position (in a direction perpendicular to the recording surface of the high density recording medium 100) of the focus lens 250 of the above optical reproducing means 200 through the two-dimension actuator control circuit 800.

Namely, the focus error signal FE, as the output from this subtraction circuit 311 ((A+D)−(B+C)), is applied with the focus off-set through the adder circuit 314, and is outputted to the two-dimension actuator control circuit 800. The settings of the off-sets for those groove and land in the D/A 313 and D/A 316 are applied to the adder 314 through an analogue switch SW 317.

Here, in those D/A converters 313 and 316 are given the off-set values for the focus control in the above groove area G and land area L from the micro-computer 400, respectively. Also, into the control input of the above switching element 317 is inputted an exchange control signal which is also outputted from the micro-computer 400, i.e., the exchange signal between the land (L) area and the groove (G) area.

Here, in those D/A converters 313 and 316 are given the off-set values for the focus control on the above groove area and land area from the micro-computer 400, respectively. Also, into the control input of the above switching element 317 is inputted an exchange control signal which is also outputted from the micro-computer 400, i.e., the exchange signal between the land (L) area and the groove (G) area.

Further, the off-set values added to the focus error signal FE through the above D/A converters 313 and 316, in the present invention, are variables which must be learned in the learning control adopted for controlling the focus position of the optical lens at the optimal position. However, when this recording/reproducing apparatus of the optical information recording medium is shipped out as products, these are preset at predetermined initial values in advance to be shipped. The preset predetermined initial values are memorized in an EPROM as being a memory means of the above micro-computer 400.

Next, the operation flow, starting from turning ON of electric power or insertion of the optical disc 100 into the tray TR and reaching up to the condition being able to read/write (i.e., ready condition), in the optical disc apparatus according to the present invention, will be explained by referring to FIG. 9.

Figure 9:
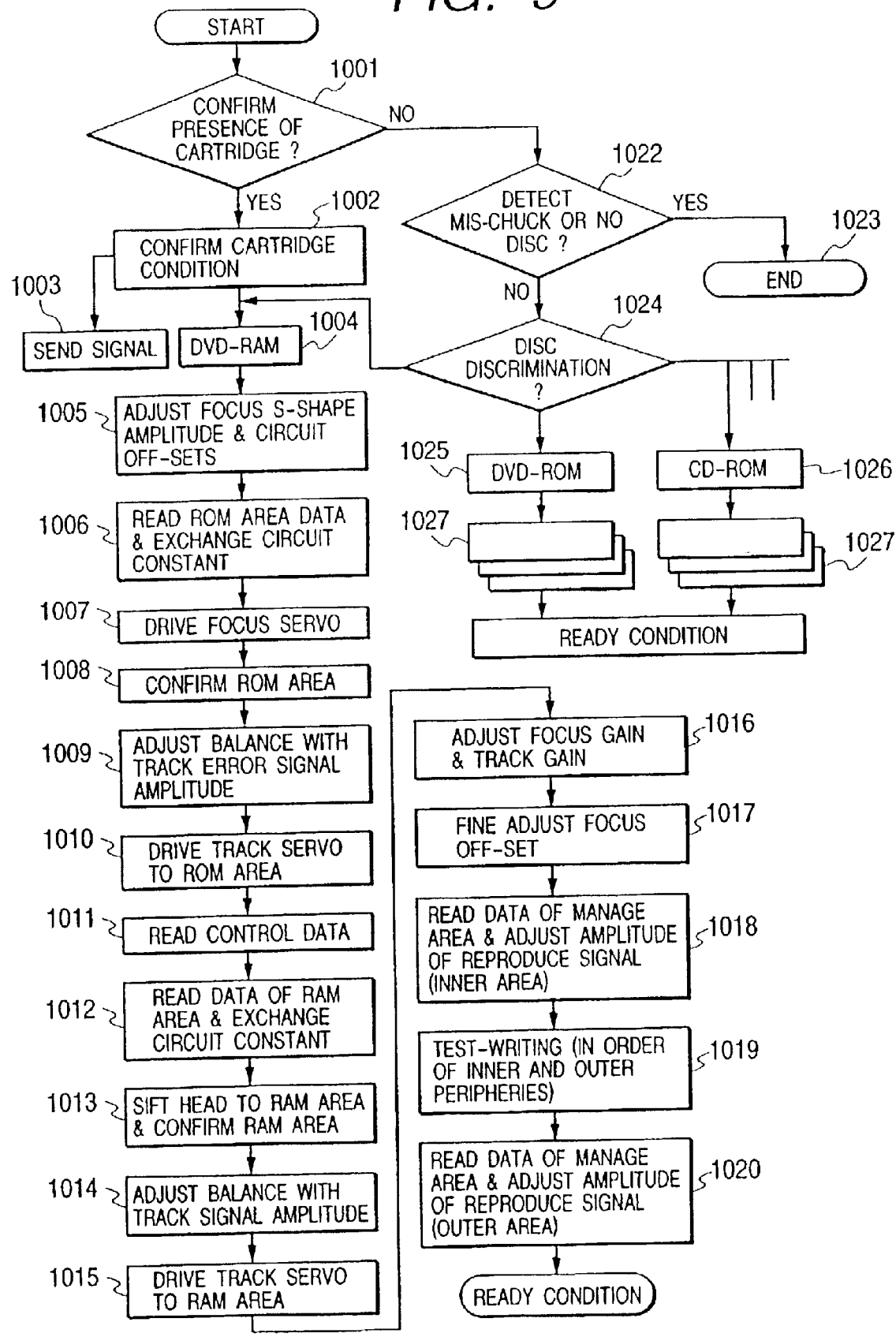
FIG. 9 is a flow chart of showing steps of the optical disc apparatus according to the present invention, until a ready condition thereof.

In FIG. 9, first, when the optical disc 100 is inserted into the tray TR of the optical disc apparatus and the tray TR is also inserted or moved therein, it is detected, and thereafter a detection is made whether there is the cartridge C or not (in step 1001). At the present time, various type of the optical discs 100, such as a CD-ROM, DVD-ROM, DVD-RAM, etc., are already practiced, however only the DVD-RAM is inserted into the cartridge C when it is used. Therefore, it is possible to identify it to be the DVD-RAM depending on the presence of the cartridge C. On a while, when there is detected no cartridge C, a detection of mischucking or wit no disc (in step 1022).

In the step 1022, the optical pickup 200 is shifted into an inner circumference to perform initial settings. In this initial settings, current, voltage, resistance and an addition signal, etc., are set at respective predetermined values. Thereafter, the focus lens 250 is changed into that for use of the CD and the semiconductor laser 210 is turned on. Then, a focus sweep is conducted to shift or mover the focus lens 250 up and down directions. A decision is made whether a FOK signal can be obtained or not in this focus sweep operation or not, and depending on the result thereof is made the decision on the condition of mis-chucking or with no disc. Further, the focus lens 250 is changed into that for use of the DVD and the semiconductor laser 210 is turned on, thereby performing the same follows to make the decision on the condition of mis-chucking or with not disc, or of presence of the disc.

Further, in this step 1022, when the optical disc 100 is not fully inserted into the disc chuck of the apparatus, i.e., the mis-chucking, or when no disc is inserted, i.e., no disc, it is also decided to be in the condition of mis-chucking disc, and a signal indicating it is sent to a host (i.e., the personal computer, etc.) which is connected to the optical disc and the step is completed or ended (in step 1023). On the contrary, when decided to be O in the detection of mis-chucking or no disc, or the presence of the disc, distinction is made on the disc (in step 1024).

Next, when being decided that the cartridge C is inserted in the step 1001, confirmation is made on the condition of the cartridge C (in step 1002). In this step 1002, the detection is made on such as the condition, for example, whether write protection is put on or not, and a signal indicating it is sent if the write protection is put on, in a step 1003. The result of the confirmation on the condition of the cartridge C is normal, then steps for DVD (i.e., steps following the step 1004).

In a step 1024 for distinction of optical disc, first the disc size is decided by rotating the motor 750, and then the current, the voltage, the resistance value and the sum signal, etc., are set to the initial values thereof, so as to perform the focus sweep operation in the same manner as in the step 1022. At this time, detection of amplitude of the FE signal is also conducted. The same flows is applied by changing to the focus lens 250 for the DVD. By comparing those results in decisions with those which are detected in advance for various kinds of the optical discs, it is possible to decide or discriminate the kind of the disc, such as the CD-ROM (1026), etc.

Then, in a case where the disc is decided to be the DVD-RAM and be in the writable condition, various adjustments are made in the focus and the tracking, etc., in the steps from the step 1005 to the step 1021, thereby reaching to a ready condition. However, the flows for reaching to the ready condition, such as the steps 1025, 1026 and so on are same to those for the DVD-RAM, therefore explanation thereon will be omitted here.

First, the optical disc apparatus conducts reading of management data which is recorded in the ROM portion 110 with the flows from a step 1005 to a step 1011. In more detail, the optical disc apparatus conducts the adjustment on the S-shaped focus adjustment width and the off-sets of circuits (in step 1005), when it decides it to be the DVD-RAM. Next, by changing over the circuit constants for reading the management data of the above RAM portion 110 (in step 1006), the head is shifted to the ROM portion of the most-inner periphery through driving of the focus servo (in step 1007), and then is made a confirmation whether the shifted destination is the above ROM portion 110 or not (in step 1008). For this ROM portion 110, the tracking error signal TE and the amplitude thereof are adjusted in balance with those in ROM portion 110 (in step 1009). Then, the tracking servo is driven with respect to the ROM portion 110 (in step 1010) so as to conduct the reading of the control data (in step 1011). The reading of the control data is initiated by positioning the head at the top of the control signal region, and it is completed by positioning it at the end thereof. Further, the reason for executing the adjustment starting from the ROM portion is for obtaining a shorten processing time. Namely, the optical pickup is located on a stopper at the internal periphery such as in a servo-off condition where the address on the disc is unrecognizable, and this condition, the position locates near to the ROM portion rather than to the RAM portion, for moving or accessing to a target position.

Next, the adjustment is conducted in the focus and the tracking for the RAM portion 120 following the flow from the step 1012 to the step 1017. In more detail, first the circuit constants are changed over for reading the data in the RAM portion 120 (in step 1012), and the optical pickup 200 is shifted or moved to the RAM portion 120 so as to make a confirmation whether the shifted destination is the above RAM portion 120 or not (in step 1013). Then, conducting adjustment on the amplitude of tracking and on balance in the RAM portion 120 (in step 1014), driving the tracking servo to the RAM portion 120 (in step 1015), and also conducting adjustment on the focus gain and the tracking gain (in step 1016), then a fine or exact adjustment is conducted on the focus off-set (in step 1017).

Next, a confirmation is made on the reading, following the flow from a step 1018 to a step 1020 below. In more detail, the optical pickup 200 is shifted to the above area 121b of the apparatus information located at the most-inner periphery, as to conduct the reading of the data of the management area or region as well as adjustment on the amplitude of the reproduced signal (in step 1018). Then, a test or trial writing is made in this most-inner periphery position, and the optical pickup 200 is shifted to the read/write area 122 at the outer periphery so as to make the test writing in this outer peripheral position (in step 1019). Next, the reading of the data of the management area and the adjustment on the amplitude of the reproduced signal are conducted in this outer peripheral position (in step 1020). After completing the flows mentioned above, the optical disc is in the ready condition.

On the optical disc under the ready condition, the optical pickup 200 is controlled to move or shift slowly from the inner periphery to the outer periphery thereof always along with the spiral track(s). With this, it is possible to protect the disc from giving damages on data, which may be caused by irradiating the laser beam on the same position if the optical pickup is fixed, and also to lower the error in accuracy following abrupt shift upon receipt of a drive command.

Though, according to the conventional art, in the above steps from 1018 to 1020, the trial writing is conducted in an order from the inner periphery to the outer periphery by shifting the optical pickup to the inner periphery after conducting the adjustment on the amplitude of the steps 1018 and 1020, therefore it necessitates much time for the shifting of the optical pickup 200. However, according to the present embodiment, the operations are conducted with shifting the optical pickup 200 along the direction from the inner periphery to the outer one, the time for shifting the optical pickup 220 can be shorten, and in addition thereto, the time for positioning the pickup 200 at a desired position from a position necessitating a large shifting distance, since each shifting distance can be made lessened or diminished.

In this manner, according to the present embodiment, each the shifting distance can be lessened or diminished so as to be conducted effectively, it is possible to shorten the time necessary to reach to the ready condition.

Further, for conducting the reproducing operation during the fine adjustment of the focus offset, the tracking servo drive must be performed with respect to the RAM area before the fine adjustment of the focus offset.

Next, explanation will be given on a method for compensating a power shortage in the semiconductor laser 210, in particular when it is writing in the fine adjustment of the FE, for example the operation flow of the trial writing in the above step 1019.

Conventionally, there can be found the optical disc apparatus which does not come to the ready condition if it is driven under a condition of room temperature of 50□ C. Studying or searching of this, the main cause of this appears to be the shortage of the power in the semiconductor laser 210 when writing in the fine adjustment of the FE. For example, it is considered that an I-L (a relationship between electric current and power of the semiconductor laser 210) is decreased down by 30% in the troubled apparatus. As a measurement for this, though it can be treated or resolved by increasing the power mentioned above, however, since the power is very important factor for conducting the recording and reproduction of data on the optical disc, there is an anxiety or possibility that the increased power may undesirably cause the damages of data under the condition of around 0□ C., reversibly if the power is risen up.

Figure 10:
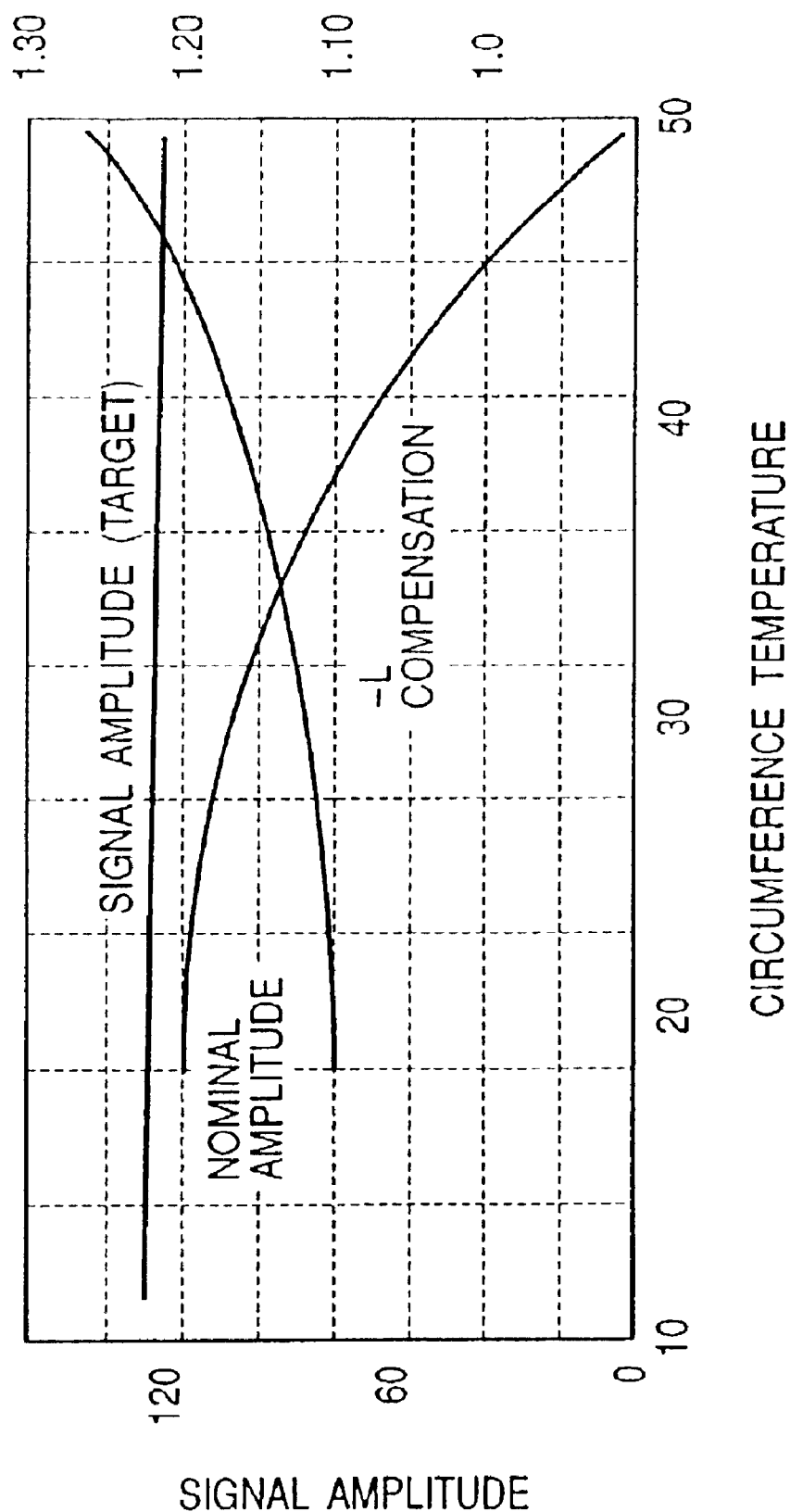
FIG. 10 shows a graph in which the horizontal axis indicates a circumference temperature and the vertical axis a signal amplitude (DAC value)

This will be explained by referring to FIG. 10 showing the result of measurement. In this FIG. 10, the horizontal axis indicates a circumference temperature of the apparatus, and the vertical axis the signal amplitude (DAC value). For example, in a case where current is constant, a nominal amplitude of the above-mentioned semiconductor laser 210 falls down in reverse proportion with increase of the circumference temperature. With applying the I-L compensation on this, there can be obtained a signal amplitude being constant at a target value thereof. For example, under the room temperature is around 50□ C, the target signal amplitude can be achieved by the compensation of 1.10.

Then, in the present embodiment, a pre-writing (trial writing) is conducted, proceeding by 1 track (about four (4) tracks) from a FE fine adjustment pattern. The value of this is taken by the front light receiving element (front monitor) 261 shown in FIG. 1, and then adjustment is made on the electric current and the voltage depending upon a front monitor value which is obtained from the front light receiving element 261, so that it comes to be equal to the initial set value, i.e., the power adjusting value within a range □10% thereof, and then the adjusted FE fine adjustment pattern is recorded or stored. In the present embodiment, the above-mentioned adjustment is executed before the step 1019 for conducting the rest write on the inner periphery, shown in the above FIG. 9.

As is mentioned previously, the above-mentioned front light receiving element 261 feeds back a predetermined signal to the above-mentioned laser driver 500, so that the signal obtained through the said front light receiving element 261, being compared with a preset reproduction target voltage, comes to be equal to the voltage. With this feedback loop, the emission light of the semiconductor laser is controlled at a constant in the intensity when reproducing the information, and for this purpose there is used a voltage detecting means in the pre-write in the stage before the recording, in this embodiment. Here, the current preset value lies in a range from 50% up to 130% of the above power adjustment value, and such a protection is applied to that the current value is set at 50% or 130% if it exceeds the rang 50% up to 130%.

Figure 11:
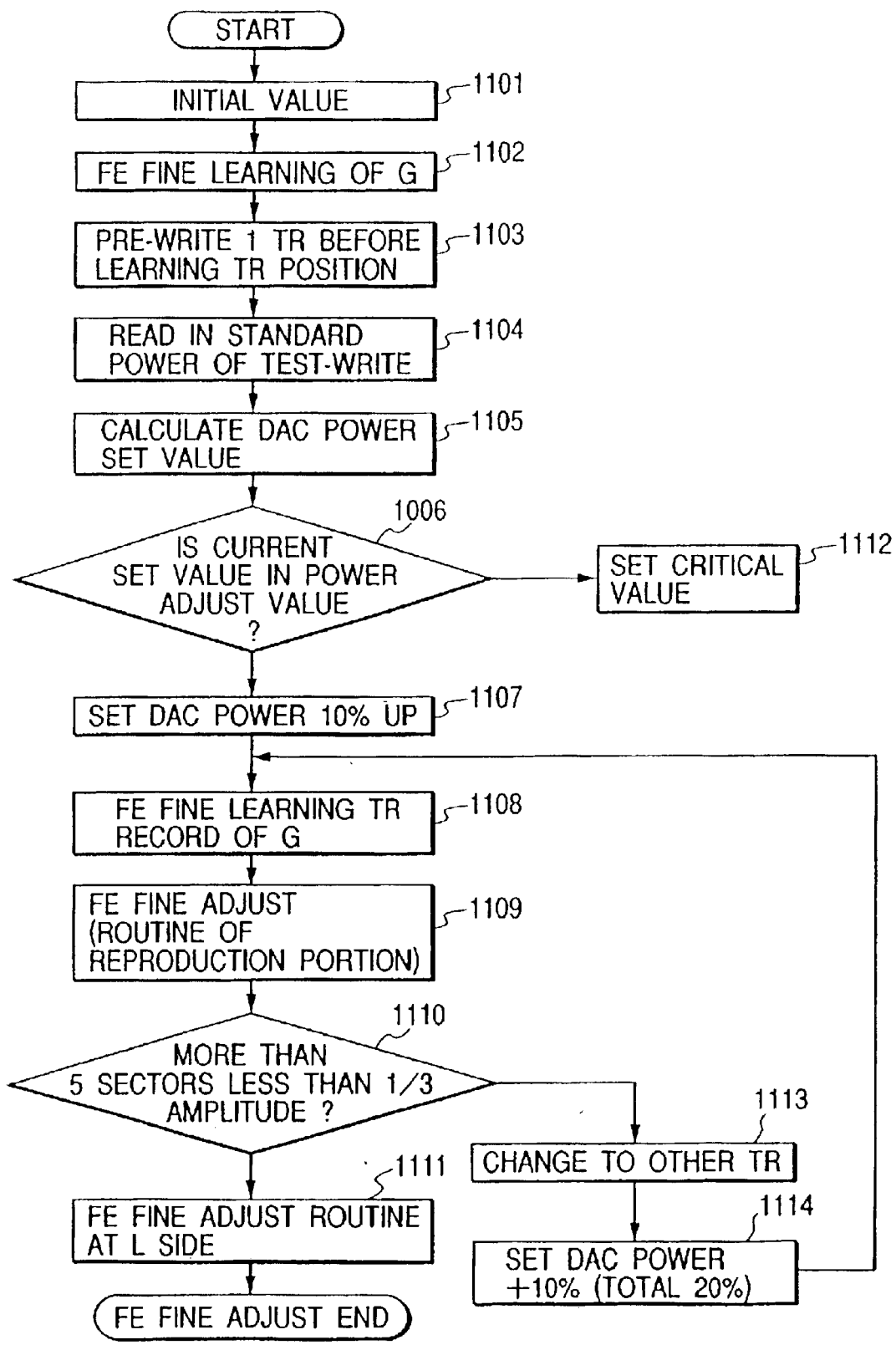
FIG. 11 is a flow chart of pre-writing of the optical disc apparatus according to the present invention.

The flow of this operation will be explained by referring to FIG. 11. In the optical disc apparatus of the present embodiment, after reading the initial set values (in step 1101) and the data for a fine learning control of the FE of groove portion (in step 1102), the pre-writing (trial writing) is conducted at a position proceeding by 1 TR (about 4 sectors) from the track position of above-mentioned learning control (in step 1103). Then, the data written in the pre-write is read out by calling up a sub-routine for a standard power for the test writing (in step 1104), and calculates the DAC power of the front monitor value which is obtained from the above-mentioned front light receiving element 261 (in step 1105). In this instance, when an error occurs in reading in the above step 1104, a retry is made on other track. Then, a decision is made whether the current preset value of the calculation result mentioned above is within the range from 50% to 130% of the power adjustment value (when shipping) or not (in step 1106). If decided within the range, the power setting of the DAC is risen up by 10% thereof (in step 1107), while if decided to be outside of the range, a critical value is set (in step 1112). After the step 1107, the power adjustment value increased by 10% is applied to a track record groove potion for the FE minute learning control (in step 1108) and the routine of reproduction portion of the FE minute learning control (in step 1109).

Then, it is decided whether there are sectors being equal or less than five (5) in the number or not, in which the value obtained by the routine of the above reproduction portion is less than ⅓ amplitude (one third in the amplitude) (in step 1110). In a case where the decision results in ES the routine for a FE minute adjustment on the groove side is executed (in step 1111). While, when the decision results in O the track is changed to another one (in step 1113), and the DAC power setting is further risen up by 10% thereof (in step 1114) so as to execute the above step 1108.

Further, when the ⅓ amplitude occurs in the sectors greater than five (5), the re-try is made on other track.

Thus, according to the present embodiment, for practicing the pre-write, exclusive areas for conducting it are prepared or provided, being separated from the trial writing areas and smaller in the number thereof. With this, it is possible to use the write area with high efficiency though having a limit (for example, 100,000 times) in the writing operation thereon. Moreover, since the pre-write is a kind of the writing operation of short time period, the above effect is further improved by executing the pre-write at random while changing the places always within the exclusive area. In addition thereto, the exclusive areas for the pre-write are provided in the inner side of the trial writing area by taking into the consideration the fact that the optical pickup is rather easily shifted or operated from the inner periphery toward to the outer periphery.

Further, according to the present embodiment, for example, the above-mentioned exclusive areas are provided in the write area 121 inside the above RAM portion 120. In more detail, the area 121*b* for the apparatus information, totally having about 112 lines of tracks therein, is separately provided, i.e., 28 lines for the pre-write area (FE minute adjustment), 70 lines for the rest-write area and 14 lines for preservation, from inner side to outer side.

In this manner, in the flows using the pre-writing according to the present embodiment, first a short focus signal (i.e., the pre-writing) is executed, and takes a rest one time, during which the contents written with the pre-writing are read out, and then a long focus signal (i.e., the trial writing) is conducted, i.e., by repeating the operations in plural of times, the optimal focus condition is set.

The above-mentioned flow using the pre-writing should be conducted after the decision of the optical disc and until it comes to be in the ready condition. Alternatively, it may conducted before the re-try when the writing is impossible.

Next, by referring to FIGS. 12 to 18, the method for controlling the focus of the optical disc apparatus according to the present invention will be explained further.

Figure 12:
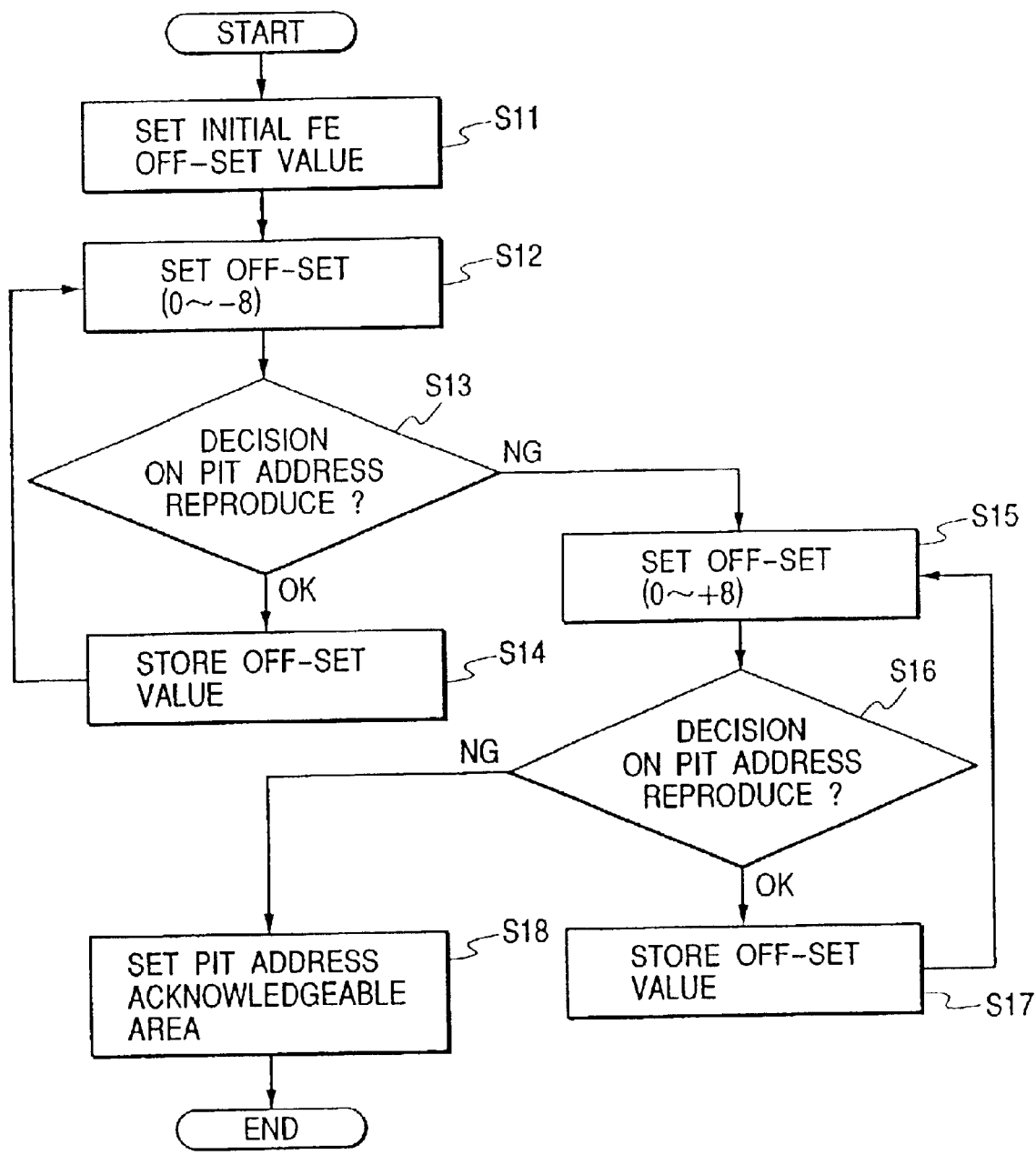
FIG. 12 is a flow chart of showing a focus control method.
Figure 13A:
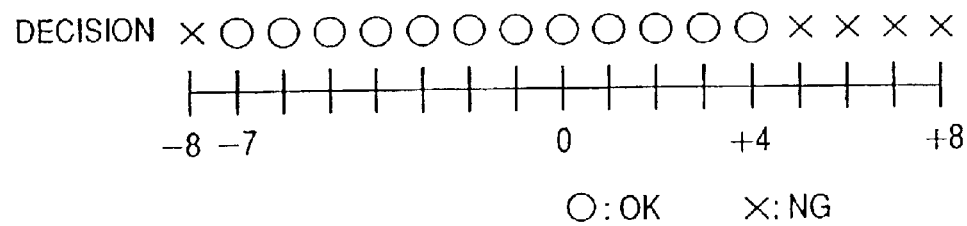
FIG. 13 is an explanatory view for explaining on a pit address acknowledgeable area in concrete, which is set by the focus control method shown in FIG. 12.
Figure 13B:
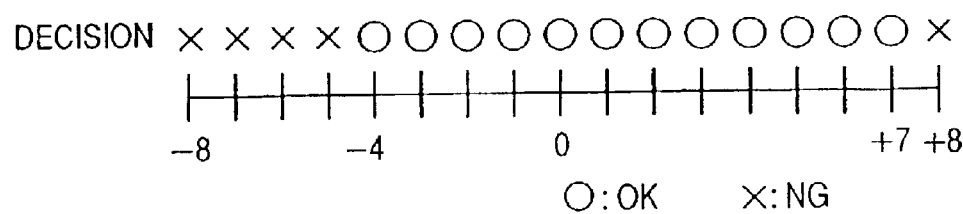
Figure 15:
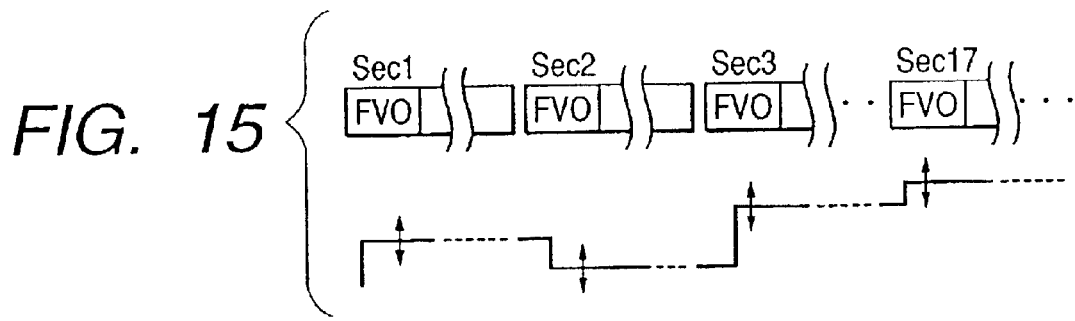
FIG. 15 is an explanatory view for explaining about an optimal FE off-set value for each sector, which is set with the learning control shown in FIG. 14.
Figure 16:
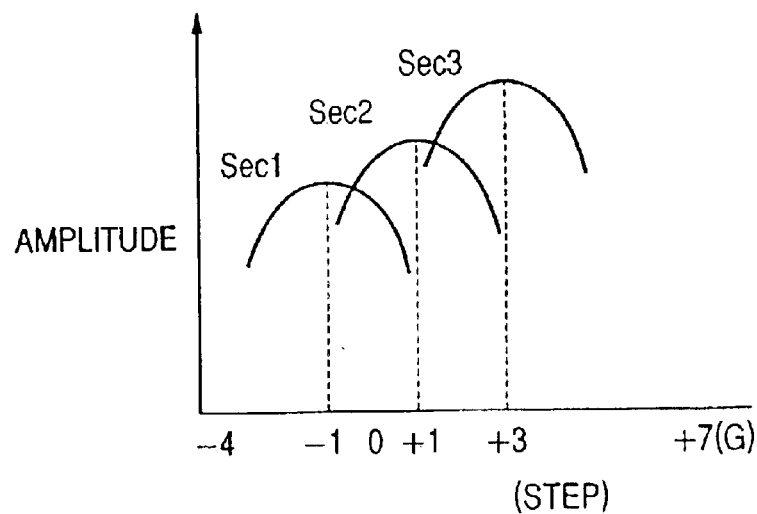
FIG. 16 is an explanatory view for explaining about an optimal FE off-set value for each sector, which is set by averaging in the learning control shown in FIG. 14.
Figure 14:
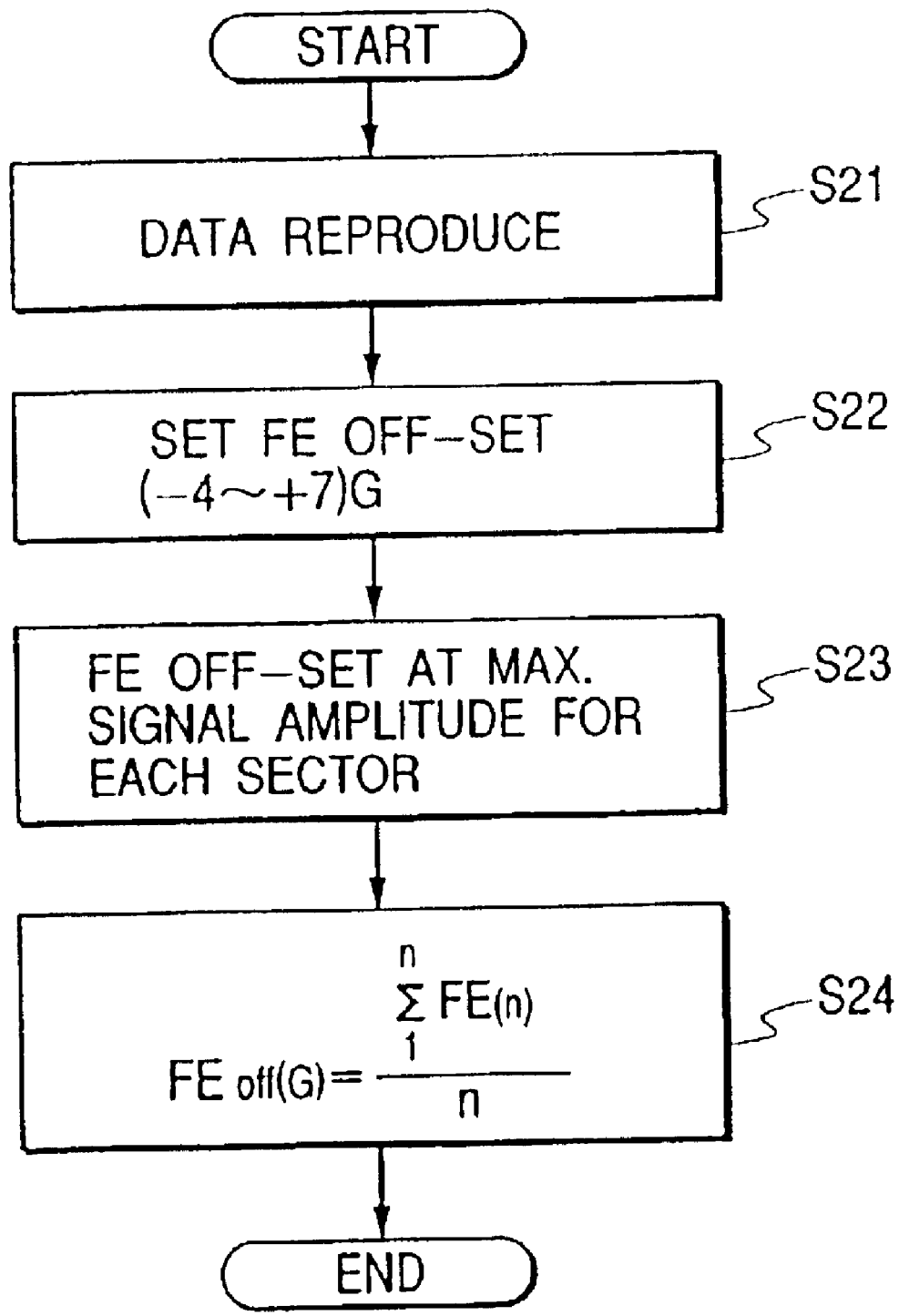
FIG. 14 is a flow chart for explaining a learning control for a focus control.

FIG. 12 is a flow chart for explaining the focus control method, FIG. 13 an explanatory view for concretely explaining a pitch address acknowledgeable area, FIG. 14 a flow chart for explaining the learning control of the focus control, FIG. 15 an explanatory view for explaining the optimal off-set value for each sector, being set by the learning control of FIG. 14, and FIG. 16 an explanatory view for briefly explaining the optimal FE off-set values which are set by averaging in the learning control of FIG. 14.

Figure 17:
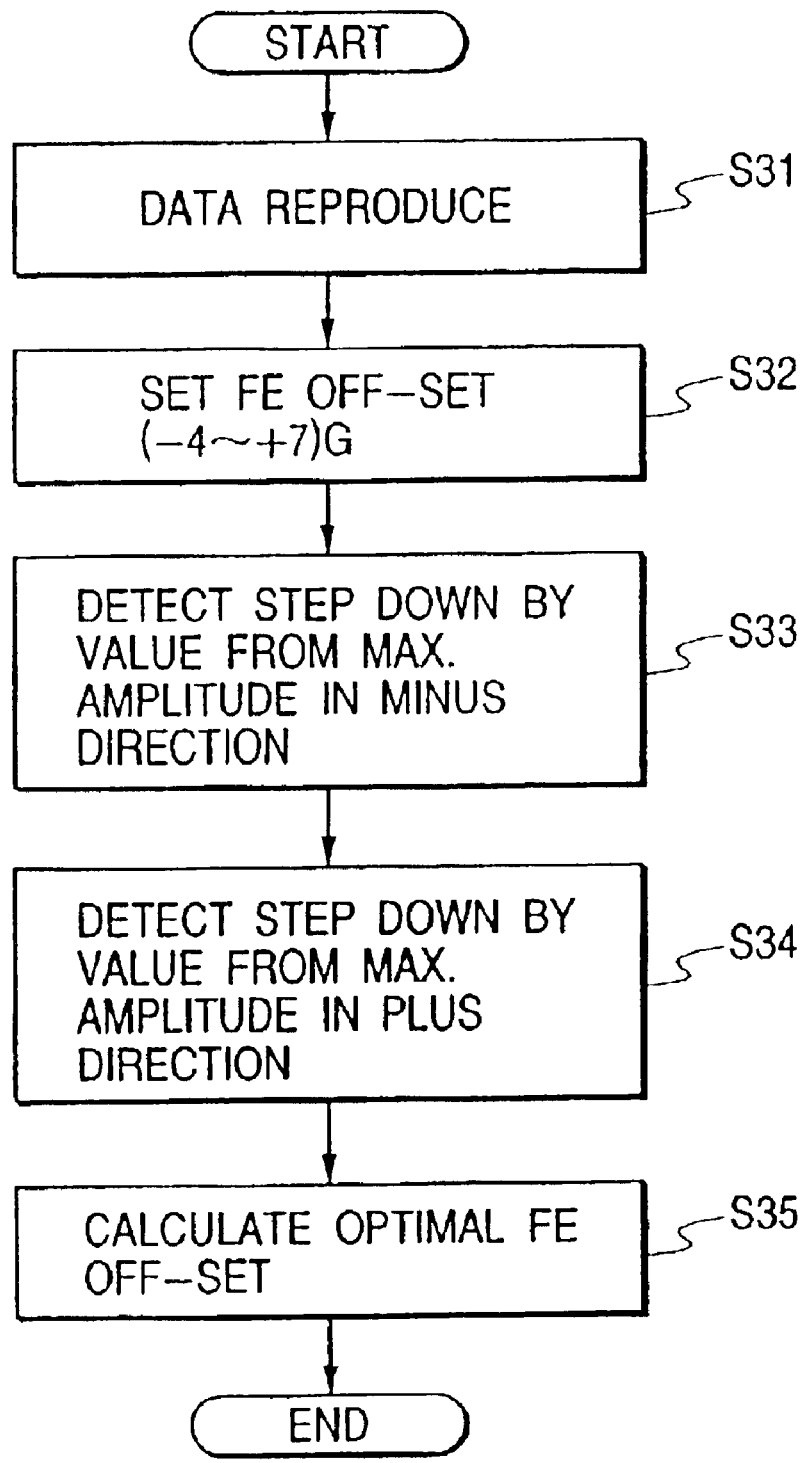
FIG. 17 is a flow chart for explaining the learning control for a focus control but according to an another embodiment.
Figure 18:
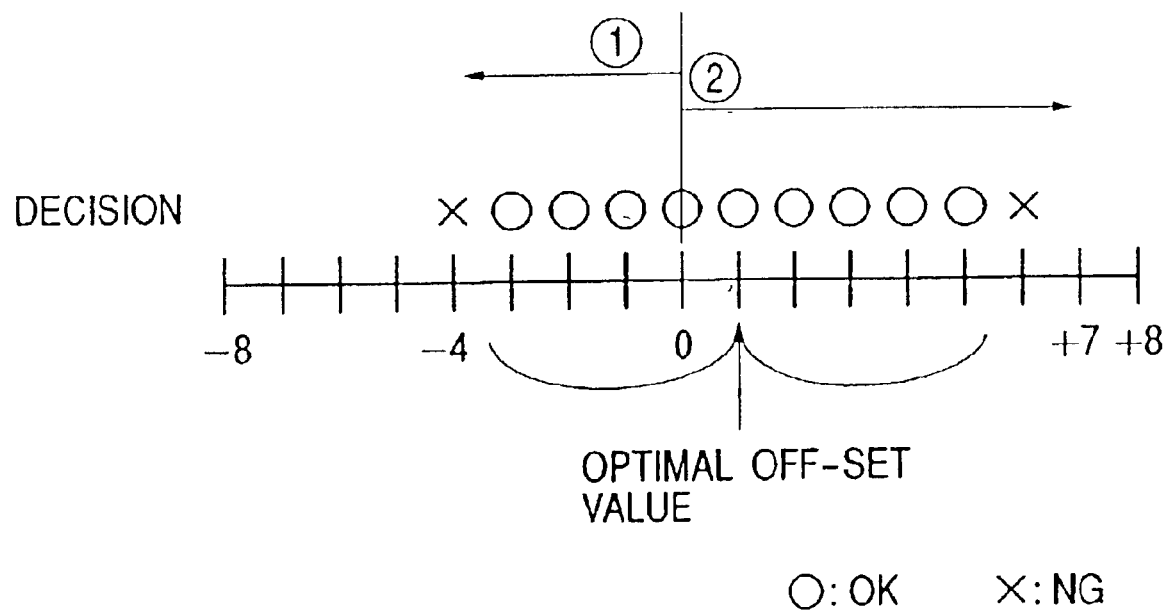
FIG. 18 is an explanatory view for explaining about the optimal FE off-set value, which is set with a maximum amplitude and a decreasing rate in the learning control shown in FIG. 14, with simplification thereof.

FIG. 17 is a flow chart for explaining the leaning control of the focus control according to another embodiment, and FIG. 18 an explanatory view for briefly explaining the optimal FE off-set values which are set by a maximum amplitude and a decreasing rate in the learning control of FIG. 14.

First, the flow chart shown in FIG. 12 is conducted before performing the learning control which will be shown in FIG. 14 below, thereby setting up a variable region of the focus potion in the learning control in advance. This flow is initiated at the same time when the reproducing apparatus is turned ON, for example, and is executed on the basis of the various output signals shown in the above FIG. 7, as well as of the above land and groove areas, respectively.

In this flow, first, the off-set value of the focus error (FE) is set up at the initial setting value (in step S11). Namely, the above micro-computer 400 sets the initial setting value at the D/A converter 313 and 316, which are memorized in the EPROM or the like when being shipped out. After that, the micro-computer 400 sets up a plurality of steps (for example, 16 steps from +8 step to −8 step) around the initial setting value (0) for control, as shown in attached FIG. 13, and changes the focus position by setting the respective step values as the off-set value for the above focus error (FE). And, then a decision is made on reproduction of the pit(s) in the pit address area at the plural focus positions. In this instance, as an condition for the decision on reproduction of the pit(s), by using the ID signals shown in the above FIG. 8(A), it is decided whether the ID signals can be acknowledged in continuous or not in the region of one round of track. Or alternatively, also the sector number detectable within one track can be a condition for such the decision.

Namely, in the above FIG. 12, first, as the off-set value is set the value from 0 down to −8 step one by one (in step S12), then it is decided whether the address can be reproduced or not by trying to acknowledge the pits P, P . . . in the above bit address area PA at each of those focus positions (in step S13). As the result, if the pit address can be reproduced (i.e., OK in the figure), the off-set value is stored (in step S14), this process is repeated until when the reproduction of the pit address comes to be impossible (i.e., NG). Thereafter, in the same manner as mentioned in the above, setting the value from 0 up to +8 step as the off-set value one by one (in step S15), making the decision in reproduction (in step S16), storing the off-set value being reproducible (in step S17), repeating this until when the reproduction comes to be impossible (i.e., NG), and finally, the off-set values within a region being variable with the learning, i.e., the off-set values with which the pit address can be recognized or acknowledged is determined by the step range (in step S18) to be completed in the process.

As a result of this, the range in which the pits P, P . . . in the pit address area PA can be recognized with certainty can be set up in the steps from −8 up to +8 around the initial off-set value (0) in the focus position control. In more details, in the above FIG. 9(A) for example, since G is at the steps −8 and +5 for the focus control in the land area, it is apparent that the pits P, P . . . in the pit address area PA can be acknowledged with certainty in the region between them, at the steps from −7 up to +4. From this, for the focus control in the land area, it is possible to control the focus position at the optimal position with keeping the reproduction of the pit address, by conducting the learning control within the range of the steps from −7 up to +4. Further, it is also same to the above for the focus control in the groove, and in an example shown in the above FIG. 9(B), it is apparent the learning control can be conducted within the range of the steps from −4 up to +7 later.

Following to the above, an explanation will be given on the learning control for controlling the optimal focus position in the above land and groove areas in which the information is recorded respectively, by referring to FIGS. 14 to 18. However, when a non-recorded disc is inserted, recording is conducted by driving the laser driver circuit 500 in test zones assigned at the most-inner periphery and the most-outer periphery of the disc. In the present learning control, since a relative change is used in amplitude of the reproduced signal of the recorded data, the setting of the recording pattern may be enough for the initial values which are set up in advance.

First, FIG. 14 shows a process flow of the learning control for the optimal focus position control, briefly. First, the reproduction of the data is conducted (in step S21). However, in this instance, as shown in the above FIG. 8(A), at a top portion of each of the sectors is positioned a VFO portion in which a predetermined pattern (number) of the pits having a predetermined width, being called T for example, and after that follows a data (DATA) portion in which the reproducible recorded information is recorded. And, here, the controlling of the optimal focus position is achieved by utilizing the intensity of the reflection light in this VFO portion. Namely, in this VFO portion, the wave-form of the reproduced signal is as shown in FIG. 8(C), however, from the above envelope detection circuit 322 (see FIG. 7) for outputting an envelope wave-form is outputted an output as shown in FIG. 8(D), i.e., a signal being always constant in the height (voltage) if the reflection factor is constant on the recording surface of the above recording medium 100. Mentioning of the reasons of adopting the 4T pattern, it is stable with respect to fluctuation of the recording pattern in the medium of type of phase change, and it was ascertained by experiments that by the greatest amplitude of this 4T pattern can be obtained the focus position at the optimal condition for recording and reproducing with the land-groove method.

Then, as is apparent in the above FIG. 7, the micro-computer 400 outputs the sample hold (S/H) signal during the period of this VFO portion, and takes in the height of the above envelope wave-from (see FIG. 8(D)) from the sample hold (S/H) circuit 323 as the value of amplitude of the reproduced signal detected. The sample hold (S/H) signal in this time and the height of the envelope wave-form to be taken in therewith, i.e., the amplitude of the reproduced signal detected (amplitude of the reproduced signal detected) are shown in the above FIGS. 8(E) and (F).

Again returning to FIG. 14, in the learning control for the optimal focus position control, next, the off-set of the focus error signal (FE) is set up (in step S22). Namely, here is set up the extent or limit with the acknowledgeable region of the pit address which is obtained in the step S18 in the above FIG. 12. In more details, for example, as shown in the above FIG. 9(B), the region being able to be set up for the groove (G) area is from −4 to +7, and this step value is set.

Thereafter, as is explained in the above, on the basis of the amplitude of the reproduced signals detected which are taken into from a plurality of the sectors, the off-set value (the step values) of the focus error (FE) is obtained at which the signal amplitude in each sector becomes maximum (step S23). And, by averaging those off-set values in the focus error (FE) obtained for each sector, there are obtained optimal off-set values FEoff(L) and FEoff(G) of the focus error (FE) for the land (L) area and the groove (G) area in the recording medium 100.

However, in the above, for dissolving non-uniformity (i.e., variety) in the reflectivity by an unit of the sector in a circumference direction of the disc, i.e., the recording medium, namely as shown in FIG. 15, for example, and when the reproduced signals detected are different in amplitude thereof one another (see FIG. 8(F)) in each sector (from Sec. 1 to Sec. 17), first, the optimal FE off-set values are obtained in each sector (in more details, by averaging the FE off-set values of a sector bridging over a plurality of circumferences being equal in the radial direction). Thereafter, by averaging the FE off-set signals of all sectors, there are obtained the optimal FE off-set values FEoff(L) and FEoff (G). Explaining this by simplifying in the attached FIG. 16, for example, in a case where there are obtained the off-set values, −1, +1 and +3, respectively for the three sectors, Sec. 1 to Sec. 3, at which the reproduced signals detected becomes maximal, the optimal FE off-set value is +1 (by unit of step) by averaging them.

For obtaining the focus off-set value of this maximum value in amplitude, there are various ways, including, a finite difference method, calculation of the maximal position with use of approximation by a curve of second degree, and a method of obtaining from a half of values at the off-set positions at right and left by decreasing by −1 dB in amplitude values from the amplitudes obtained to be almost maximal, etc. Here is explained, however, a method for obtaining at the value being decreased by a predetermined value from the amplitude from which the almost maximum value is obtained, by referring to FIGS. 17 and 18.

In FIG. 17, as similar to the flow shown in FIG. 14, the reproduction of data is conducted (in step S31), and then is conducted the setting of the off-set of the focus error (FE) (in step S32).

Thereafter, the almost maximum value of amplitude is obtained on basis of the amplitude of the reproduced signals detected, which are taken into from the plurality of sectors, and then the off-set positions at both sides thereof is obtained, at which the amplitude value is decreased down by a predetermined amount thereof from the almost maximum value (in steps S33, S34).

This will be explained in more detail by referring to FIG. 18. First, in a step S33, by deciding steps in a minus direction (1) from the initial set value (0) and then in a plus direction (2), one by one, the step(s) at which the value in the amplitude is lower than a predetermined value is decided. For example, in FIG. 18, the decision starts from the step −1 and finds the decrease in the amplitude value at the step −3, then the decision in the minus direction (1) is or ended here.

Then, it starts from the step +1 and finds the decrease in the amplitude value at the step +7, then the decision in the plus direction (2) is or ended here.

Next, a half value between the both steps in the minus direction and the plus direction (in step S35). For instance, a half value +1 is obtained between the step −3 and +7. Thus, this value can be the optimal off-set value. This value is practiced to the land (L) area and the groove (G) area, respectively.

According to this embodiment, comparing to the embodiment explained in FIG. 14, the number of steps for detecting with driving the optical disc rotationally can be lowered greatly. Also, though conventionally detection errors may occurs due to the asymmetric wave-form in the embodiment shown in FIG. 14, however with the present embodiment, such the error in the detection can be released. Further, with this embodiment, not on all the initial values, the decision is completed or ended at the time point when detecting the decrease in the amplitude value from the predetermined value in the sequential decisions in one of the directions of the steps, thus obtaining the shortened time for decision. In the present instance, the decision is conducted in the direction from 0 to −8, and then in the direction from 0 to +8, for example, therefore the time for the decision can be shortened comparing to the method of deciding in the plus and the minus directions one by one. The present embodiment can be practiced even if the minus direction and the plus direction are replaced with each other. Moreover, this decision method can be applied to the decision shown in FIG. 13.

However, as is apparent from the above explanation, if the optimal FE off-set value obtained with the above control goes beyond the range of the steps (i.e., from −7 to +4) set in the above step 22, the value being the nearest thereto among the set values, i.e., −7 or +4 is selected as the optimal EF off-set value. Namely, with this, it is possible to control the focus position of the above optical pickup at the optimal position while always reading the address signal in the pit address area correctly. Namely, without loosing the total operation as the reproducing apparatus due to the omission or defect of the address information, the superior focus control can be obtained always.

In the explanation in the above, however, so-called the learning control is explained, as the one method for the optimal positioning control in the focus, however, the present invention should not be restricted to such the learning control only. Namely, it is apparent that the present invention can be also applied to even when adopting other control methods for performing the optimal positioning control of the focus, in the same manner as mentioned in the above.

Further, in the explanation of the above embodiment, the explanation was given only on the reproducing apparatus and the operations thereof, which reads out the information being recorded in the above optical information recording medium 100 in advance. However, the present invention should not be restricted to the reproducing apparatus for use only in reproducing (i.e., read-only), but further it can be applied to the recording/reproducing apparatus of the optical information recording medium having a function of writing information in addition thereto. And, when applying the present invention to the recording/reproducing apparatus for the optical information recording medium, it is possible to apply the present invention to the focus control not only when reproducing the information but also when recording the information, in the same manner as mentioned in the above. And also in such a case, since the address information on the recording surface of the optical information recording medium can be obtained with certainty when recording, it would be apparent from the above explanation to obtain the more optimal recording operation of information.

What is claimed is:

1. An optical disc apparatus for recording and reproducing information with respect to an optical disc, comprising:

means for reading control information recorded in a pre-recorded area of said optical disc;

means for conducting focus control based on a focus error signal recorded in a first predetermined area of said optical disc;

determining means for determining an optimum offset value of the focus error signal recorded in said first predetermined area of said optical disc;

means for conducting adjustment in amplitude of a reproduced signal read from a second predetermined area of said optical disc; and means for conducting test-writing in a third predetermined area of said optical disc, so as to make said optical disc in a reproducible and recordable condition.

2. An optical disc apparatus as defined in the claim 1, wherein said test-writing conducting means conducts the test-writing at random changed places in said third predetermined area.

3. An optical disc apparatus as defined in the claim 1, wherein said third predetermined area is provided within said first predetermined area of said optical disc.

4. An optical disc apparatus as defined in the claim 3, wherein said third predetermined area is provided in an inner side of said optical disc.

5. An optical disc apparatus as defined in the claim 1, wherein said third predetermined area is provided in an outer side of said optical disc.

6. A method for making an optical disc in a reproducible and recordable condition with use of an apparatus for recording and reproducing of the optical disc having a pre-recorded area, a first predetermined area, a second predetermined area and a third predetermined area on a surface thereof, comprising the steps of:

reading control information recorded in said prerecorded area of said optical disc;

conducting focus control based on a focus error signal recorded in said first predetermined area of said optical disc;

determining an optimum offset value of the focus error signal recorded in said first predetermined area of said optical disc;

conducting adjustment in amplitude of a reproduced signal read from said second predetermined area of said optical disc; and conducting test-writing in said third predetermined area of said optical disc, so as to make said optical disc in a reproducible and recordable condition.

7. A method as defined in the claim 6, wherein said test-writing is conducted by changing places at random in said third predetermined area.

8. A method as defined in the claim 6, wherein said third predetermined area is provided within said first predetermined area of said optical disc.

9. A method as defined in the claim 8, wherein said third predetermined area is provided in an inner side of said disc.

10. A method as defined in the claim 6, wherein said third predetermined area is provided in an outer side of said optical disc.

* * * * *